(12) United States Patent
Zeng et al.

(10) Patent No.: US 10,678,253 B2
(45) Date of Patent: Jun. 9, 2020

(54) CONTROL SYSTEMS, CONTROL METHODS AND CONTROLLERS FOR AN AUTONOMOUS VEHICLE

(71) Applicant: GM GLOBAL TECHNOLOGY OPERATIONS LLC, Detroit, MI (US)

(72) Inventors: Shuqing Zeng, Sterling Heights, MI (US); Wei Tong, Troy, MI (US); Upali P. Mudalige, Oakland Township, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 21 days.

(21) Appl. No.: 15/988,658

(22) Filed: May 24, 2018

(65) Prior Publication Data

US 2019/0361456 A1 Nov. 28, 2019

(51) Int. Cl.
*G05D 1/02* (2020.01)
*G01C 21/20* (2006.01)

(52) U.S. Cl.
CPC ........... *G05D 1/0223* (2013.01); *G01C 21/20* (2013.01)

(58) Field of Classification Search
None
See application file for complete search history.

(56) References Cited

U.S. PATENT DOCUMENTS 9,042,639 B2 * 5/2015 Franke ............... G06K 9/00201
382/154
2018/0154899 A1 * 6/2018 Tiwari ................. G08G 1/0112

OTHER PUBLICATIONS

Graupe, "Principles of Artificial Neural Networks", 3rd Edition, University of Illinois, Chicago, Illinois, World Scientific Publishing Company, 2013, p. 24 (Year: 2013).*
Grymin et al., "A hierarchical approach for primitive-based motion planning and control of autonomous vehicles", Department of Aerospace and Ocean Engineering, Virginia Tech, Blacksburg, Virginia, Robotics and Autonomous Systems 62 (2014) p. 214-228 (Year: 2014).*
Lipson et al., "Driverless: Intelligent Cars and the Road Ahead", MIT, 2016, p. 210-218 (Year: 2016).*
(Continued)

*Primary Examiner* — Tamara L Weber
(74) *Attorney, Agent, or Firm* — Lorenz & Kopf LLP

(57) ABSTRACT

Systems and methods are provided for controlling an autonomous vehicle (AV). A map generator module processes sensor data to generate a world representation of a particular driving scenario (PDS). A scene understanding module (SUM) processes navigation route data, position information and a feature map to define an autonomous driving task (ADT), and decomposes the ADT into a sequence of sub-tasks. The SUM selects a particular combination of sensorimotor primitive modules (SPMs) to be enabled and executed for the PDS. Each one of the SPMs addresses a sub-task in the sequence. A primitive processor module executes the particular combination of the SPMs such that each generates a vehicle trajectory and speed (VTS) profile. A selected one of the VTS profiles is then processed to generate the control signals, which are then processed at a low-level controller to generate commands that control one or more of actuators of the AV.

9 Claims, 13 Drawing Sheets

(56) References Cited

OTHER PUBLICATIONS

Wieszok et al., "Stixel Based Scene Understanding for Autonomous Vehicles", Centre for Electronic Warfare Information and Cyber, Cranfield Universit, UK Defence Academy, Shrivenham, UK, 2017 IEEE 14th International Conference on Networking, Sensing and Control (ICNSC), p. 43-48 (Year: 2017).*

Pfeiffer et al., "Efficient Representation of Traffic Scenes by Means of Dynamic Stixels", University of California, San Diego, California, 2010 IEEE Intelligent Vehicles Symposium, p. 217-224 (Year: 2010).*

Girshick, R., "Fast R-CNN", Obtained from the Internet. URL arXiv:1504.08083 [cs.CV].

* cited by examiner

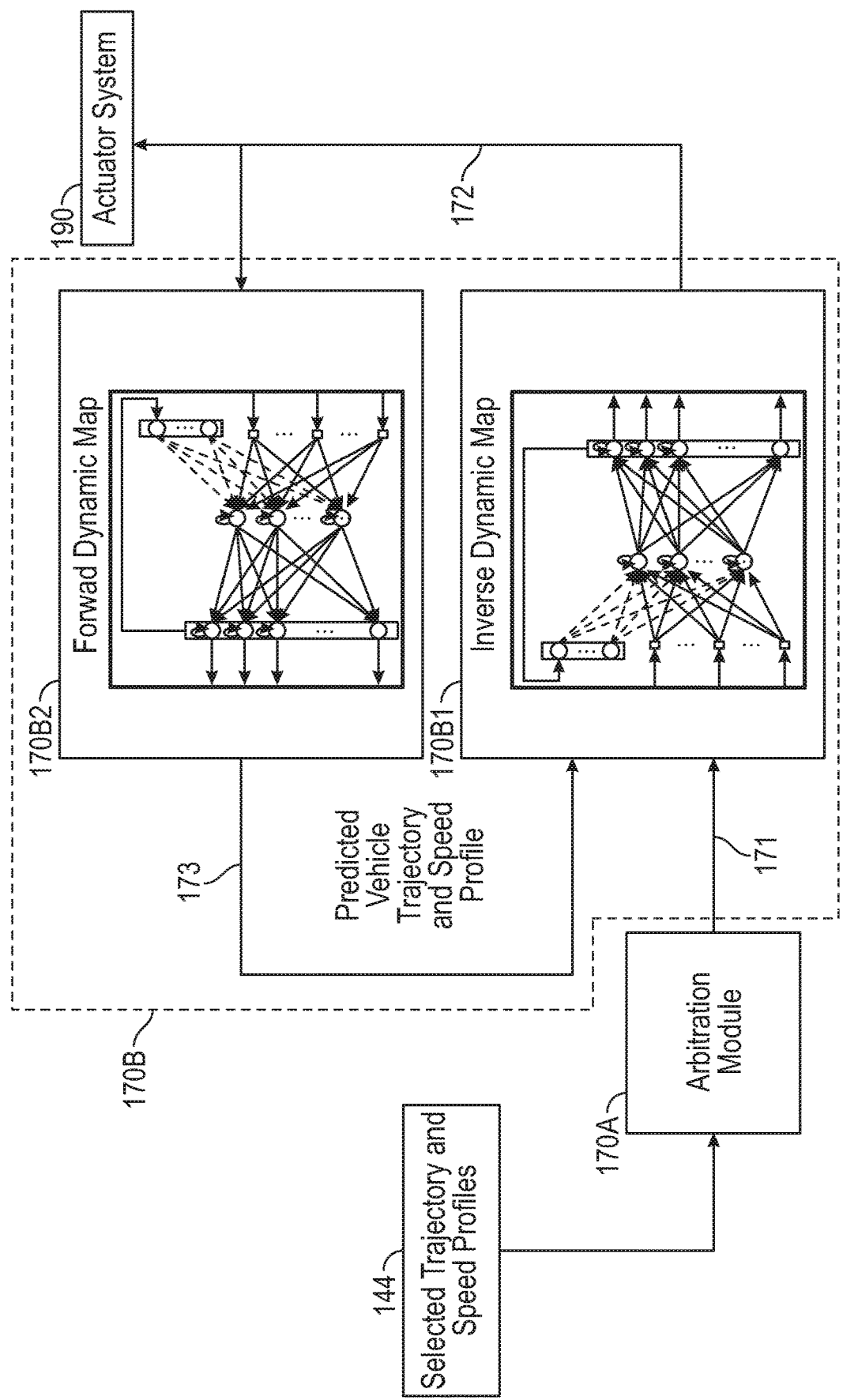

CONTROL SYSTEMS, CONTROL METHODS AND CONTROLLERS FOR AN AUTONOMOUS VEHICLE

INTRODUCTION

The present disclosure generally relates to autonomous vehicles, and more particularly relates to autonomous vehicle controllers, autonomous vehicle control system systems and associated methods for controlling autonomous vehicles. The control systems, control methods and controllers use an ensemble of sensorimotor primitives to control an autonomous vehicle by processing scene elements acquired by sensors in a particular driving scenario to select and prioritize appropriate sensorimotor primitive modules for controlling an autonomous vehicle. Execution of the appropriate sensorimotor primitive modules can generate vehicle trajectory and speed profiles that are used to generate control signals and actuator commands for controlling the autonomous vehicle to achieve the vehicle trajectory and speed profiles needed to address the particular driving scenario.

An autonomous vehicle is a vehicle that is capable of sensing its environment and navigating with little or no user input. An autonomous vehicle includes an autonomous driving system (ADS) that intelligently controls the autonomous vehicle. A sensor system senses its environment using sensing devices such as radar, lidar, image sensors, and the like. The ADS can also process information from global positioning systems (GPS) technologies, navigation systems, vehicle-to-vehicle communication, vehicle-to-infrastructure technology, and/or drive-by-wire systems to navigate the vehicle.

Vehicle automation has been categorized into numerical levels ranging from Zero, corresponding to no automation with full human control, to Five, corresponding to full automation with no human control. Various automated driver-assistance systems, such as cruise control, adaptive cruise control, and parking assistance systems correspond to lower automation levels, while true "driverless" vehicles correspond to higher automation levels. Currently, there are many different approaches for autonomous vehicle control, but all suffer from drawbacks.

Many autonomous vehicles being proposed today that are capable of providing higher automation levels require technologies such as high-definition (HD) maps to provide lane-level topology, geometry, additional attributes such as speed limit, traffic flow direction, etc., and high-precision GPS equipment to accurately locate the vehicle in the HD map. For example, many ADSs have a well-defined, layered architecture that relies on availability of HD maps and high-precision GPS. However, when these are not readily available such systems can be unreliable, and/or unable to address unknown use cases (e.g., unknown driving environments and driving scenarios). For example, in some cases, the autonomous vehicle may not be equipped with HD maps and high-precision GPS, while in other cases these technologies may not be available due to limited network connectivity. In addition, mapping all transportation road network in HD around the world is a daunt engineering task, and maintain its accuracy is costly. On the other hand, the high-precision GPS is not available in certain areas such as those with less satellite visibility (e.g., urban canyons).

Further, many ADSs require computational complexity and power consumption due to over-engineered, layered architectures (e.g., sensor->perception->scenario analysis-> behavior->maneuver->motion planning->control). For example, some ADSs rely on a single end-to-end neural network that maps image pixels to control actions for every driving scenario. However, training such a complex neural network may not be practical in terms of achieving automotive reliability in all environments or use cases. Validation of such neural networks is also very difficult. It is also difficult to assess limits on performance requirements (e.g., "How good is good enough?"). In addition, any time new features are learned system-level re-validation is required.

Accordingly, it is desirable to provide systems and methods for autonomous vehicle control that are reliable, easy to train and validate, but do not require availability of HD maps and high-precision GPS. Furthermore, other desirable features and characteristics of the present disclosure will become apparent from the subsequent detailed description and the appended claims, taken in conjunction with the accompanying drawings and the foregoing technical field and background.

SUMMARY

System, methods and controller are provided for controlling an autonomous vehicle. A method for controlling an autonomous vehicle is provided. A map generator module of a high-level controller processes sensor data from a sensor system to generate a world representation of a particular driving scenario as represented by the sensor data, navigation route data that indicates a route of the autonomous vehicle, and vehicle position information that indicates location of the autonomous vehicle at a particular instant of time. A scene understanding module of the high-level controller processes navigation route data that indicates a route of the autonomous vehicle, position information that indicates location of the autonomous vehicle and a feature map of the world representation to define an autonomous driving task, and decomposes the autonomous driving task into a sequence of sub-tasks that address the particular driving scenario. The scene understanding module selects a particular combination of sensorimotor primitive modules to be enabled and executed for the particular driving scenario from a plurality of sensorimotor primitive modules. Each one of the particular combination of the sensorimotor primitive modules addresses a sub-task in the sequence. A selector module retrieves the particular combination of the sensorimotor primitive modules from memory, and a primitive processor module executes the particular combination of the sensorimotor primitive modules such that each generates a vehicle trajectory and speed profile. A selected one of the vehicle trajectory and speed profiles is then processed to generate the control signals, which are then processed at a low-level controller to generate commands that control one or more of actuators of the autonomous vehicle to execute one or more control actions to automatically control the autonomous vehicle to automate the autonomous driving task encountered in the particular driving scenario.

In one embodiment, a feature map generator module processes the sensor data to generate the feature map based on the sensor data. The feature map comprises a machine-readable representation of the driving environment that includes features of the driving environment acquired via the sensor system at any given instant.

In one embodiment, a perception map generator module of the map generator module processes the feature map to detect objects based on the feature map, classifies the detected objects according to semantic classes, and generates a perception map of the world representation based on the feature map. The perception map comprises a human-readable representation of the driving environment that includes scenes being acquired via the sensor system at any given instant. In one embodiment, the perception map comprises bounding box location, orientation, and velocity of each detected object that are detected from the perception map; an image segmentation of freespace that includes freespace features for the environment; road feature locations/types for the environment; and stixels that approximate object boundaries that are detected.

In one embodiment, each sensorimotor primitive module is executable to generate a vehicle trajectory and speed profile for automatically controlling the autonomous vehicle to cause the autonomous vehicle to perform a specific driving maneuver.

In one embodiment, the low-level controller processes control signals from the vehicle control module to generate commands that control one or more of actuators of the autonomous vehicle in accordance with the control signals to schedule and execute one or more control actions to be performed. The one or more control actions automatically control the autonomous vehicle to automate the autonomous driving task encountered in the particular driving scenario and achieve the selected one of vehicle trajectory and speed profiles. The actuators can include one or more of a steering controller, a brake system, and a throttle system.

In one embodiment, an autonomous vehicle control system is provided that includes: a sensor system, a high-level controller and a low-level controller. The high-level controller comprises: a map generator module, a vehicle controller module, and a vehicle control module. The vehicle controller module comprises a memory configured to store a plurality of sensorimotor primitive modules; a scene understanding module, a selector module, and a primitive processor module.

The sensor system is configured to provide sensor data to the high-level controller. The map generator module is configured to process the sensor data to generate a world representation of a particular driving scenario as represented by the sensor data at a particular instant of time. The memory is configured to store a plurality of sensorimotor primitive modules. The scene understanding module is configured to: process navigation route data that indicates a route of the autonomous vehicle, position information that indicates location of the autonomous vehicle and a feature map of the world representation to define an autonomous driving task; decompose the autonomous driving task into a sequence of sub-tasks that address the particular driving scenario; and select a particular combination of the sensorimotor primitive modules to be enabled and executed for the particular driving scenario. Each one of the particular combination of the sensorimotor primitive modules addresses a sub-task in the sequence. The selector module configured to retrieve the particular combination of the sensorimotor primitive modules from the memory. The primitive processor module is configured to execute the particular combination of the sensorimotor primitive modules such that each generates a vehicle trajectory and speed profile. The vehicle control module is configured to process a selected one of the vehicle trajectory and speed profiles to generate the control signals. The low-level controller is configured to process the control signals to generate commands that control one or more of actuators of the autonomous vehicle to execute one or more control actions to automatically control the autonomous vehicle to automate the autonomous driving task encountered in the particular driving scenario.

In one embodiment, the map generator module comprises: a feature map generator module that is configured to process the sensor data to generate the feature map based on the sensor data. The feature map comprises: a machine-readable representation of the driving environment that includes features of the driving environment acquired via the sensor system at any given instant.

In one embodiment, the world representation further comprises a perception map, and the map generator module comprises: a perception map generator module that is configured to: process the feature map to detect objects based on the feature map; classify the detected objects according to semantic classes; and generate a perception map of the world representation based on the feature map.

In one embodiment, the perception map comprises: a human-readable representation of the driving environment that includes scenes being acquired via the sensor system at any given instant. The perception map can include bounding box location, orientation, and velocity of each detected object that are detected from the perception map; an image segmentation of freespace that includes freespace features for the environment; road feature locations/types for the environment; and stixels that approximate object boundaries that are detected.

In one embodiment, each sensorimotor primitive module is executable to generate a vehicle trajectory and speed profile for automatically controlling the autonomous vehicle to cause the autonomous vehicle to perform a specific driving maneuver.

In one embodiment, the autonomous vehicle control system further comprises an actuator system comprises a plurality of actuators of a vehicle, wherein the actuators include one or more of a steering controller, a brake system, and a throttle system. The low-level controller is configured to process the control signals to generate commands that control one or more of the actuators in accordance with the control signals to schedule and execute one or more control actions to be performed to automatically control the autonomous vehicle to automate the autonomous driving task encountered in the particular driving scenario and achieve the selected one of vehicle trajectory and speed profiles.

A controller for an autonomous vehicle is provided. The controller comprises vehicle controller module, a vehicle control module and a low-level controller. The vehicle controller module comprises: a scene understanding module that is configured to: process navigation route data that indicates a route of the autonomous vehicle, position information that indicates location of the autonomous vehicle and a feature map of a world representation to define an autonomous driving task; decompose the autonomous driving task into a sequence of sub-tasks that address a particular driving scenario; and select, from a plurality of sensorimotor primitive modules, a particular combination of sensorimotor primitive modules to be enabled and executed for the particular driving scenario, wherein each one of the particular combination of the sensorimotor primitive modules addresses a sub-task in the sequence; a selector module configured to retrieve the particular combination of the sensorimotor primitive modules from memory; and a primitive processor module configured to execute the particular combination of the sensorimotor primitive modules such that each generates a vehicle trajectory and speed profile. The vehicle control module is configured to process a selected one of the vehicle trajectory and speed profiles to generate the control signals. The low-level controller is configured to process the control signals to generate commands that control one or more of actuators of the autonomous vehicle to execute one or more control actions to automatically control the autonomous vehicle to automate the autonomous driving task encountered in the particular driving scenario.

In one embodiment, the controller further comprises: a map generator module that is configured to process sensor data to generate the world representation of the particular driving scenario as represented by sensor data, at a particular instant of time, wherein the world representation comprises a perception map and the feature map.

In one embodiment, the map generator module comprises: a two-stage neural network (NN) comprising: a feature map generator module that is configured to process the sensor data to generate the feature map based on the sensor data; and a perception map generator module that is configured to process the feature map to detect objects based on the feature map; classify the detected objects according to semantic classes; and generate the perception map based on the feature map.

In one embodiment, the feature map comprises: a machine-readable representation of the driving environment that includes features of the driving environment acquired via the sensor system at any given instant; and the perception map comprises: a human-readable representation of the driving environment that includes scenes being acquired via the sensor system at any given instant, wherein the perception map comprises: bounding box location, orientation, and velocity of each detected object that are detected from the perception map; an image segmentation of freespace that includes freespace features for the environment; road feature locations/types for the environment; and stixels that approximate object boundaries that are detected.

In one embodiment, each sensorimotor primitive module is executable to generate a vehicle trajectory and speed profile for automatically controlling the autonomous vehicle to cause the autonomous vehicle to perform a specific driving maneuver.

In one embodiment, the low-level controller is configured to process the control signals to generate commands that control one or more actuators of the autonomous vehicle in accordance with the control signals to schedule and execute one or more control actions to be performed to automatically control the autonomous vehicle. The one or more control actions automate the autonomous driving task encountered in the particular driving scenario and achieve the selected one of vehicle trajectory and speed profiles. The actuators include one or more of a steering controller, a brake system, and a throttle system.

BRIEF DESCRIPTION OF THE DRAWINGS

The exemplary embodiments will hereinafter be described in conjunction with the following drawing figures, wherein like numerals denote like elements, and wherein:

FIG. 9A is a block diagram that illustrates an arbitration module, a vehicle control module and an actuator system of FIG. 5 in accordance with the disclosed embodiments;

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Figure 1:
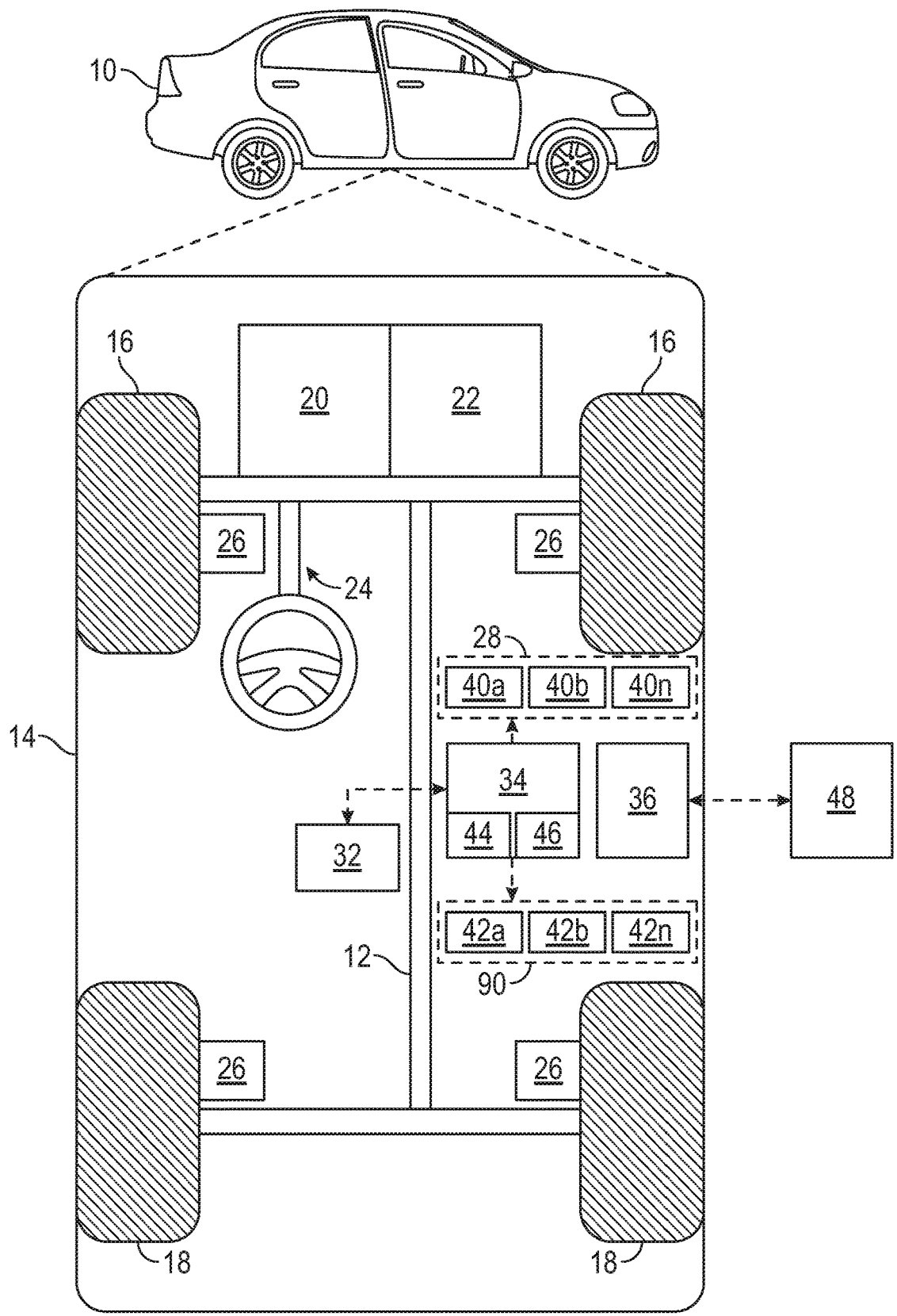
FIG. 1 is a functional block diagram illustrating an autonomous vehicle in accordance with the disclosed embodiments.

FIG. 1 is a functional block diagram illustrating an autonomous vehicle in accordance with the disclosed embodiments. As depicted in FIG. 1, the vehicle 10 generally includes a chassis 12, a body 14, front wheels 16, and rear wheels 18. The body 14 is arranged on the chassis 12 and substantially encloses components of the vehicle 10. The body 14 and the chassis 12 may jointly form a frame. The wheels 16-18 are each rotationally coupled to the chassis 12 near a respective corner of the body 14.

In various embodiments, the vehicle 10 is an autonomous vehicle and an autonomous driving system (ADS) is incorporated into the autonomous vehicle 10 (hereinafter referred to as the autonomous vehicle 10) that intelligently controls the vehicle 10. The autonomous vehicle 10 is, for example, a vehicle that is automatically controlled to carry passengers from one location to another. The vehicle 10 is depicted in the illustrated embodiment as a passenger car, but it should be appreciated that any other vehicle including motorcycles, trucks, sport utility vehicles (SUVs), recreational vehicles (RVs), marine vessels, aircraft, etc., can also be used. In an exemplary embodiment, the autonomous vehicle 10 can be, for example, a Level Four or Level Five automation system. A Level Four system indicates "high automation", referring to the driving mode-specific performance by an automated driving system of all aspects of the dynamic driving task, even if a human driver does not respond appropriately to a request to intervene. A Level Five system indicates "full automation", referring to the full-time performance by an automated driving system of all aspects of the dynamic driving task under all roadway and environmental conditions that can be managed by a human driver.

As shown, the autonomous vehicle 10 generally includes a propulsion system 20, a transmission system 22, a steering system 24, a brake system 26, a sensor system 28, at least one data storage device 32, at least one controller 34, a communication system 36, and an actuator system 90. The propulsion system 20 may, in various embodiments, include an internal combustion engine, an electric machine such as a traction motor, and/or a fuel cell propulsion system. The transmission system 22 is configured to transmit power from the propulsion system 20 to the vehicle wheels 16-18 according to selectable speed ratios. According to various embodiments, the transmission system 22 may include a step-ratio automatic transmission, a continuously-variable transmission, or other appropriate transmission. The brake system 26 is configured to provide braking torque to the vehicle wheels 16-18. The brake system 26 may, in various embodiments, include friction brakes, brake by wire, a regenerative braking system such as an electric machine, and/or other appropriate braking systems. The steering system 24 influences a position of the of the vehicle wheels 16-18. While depicted as including a steering wheel for illustrative purposes, in some embodiments contemplated within the scope of the present disclosure, the steering system 24 may not include a steering wheel.

The sensor system 28 includes one or more sensing devices 40a-40n that sense observable conditions of the exterior environment and/or the interior environment of the autonomous vehicle 10. The sensing devices 40a-40n can include, but are not limited to, radars, lidars, optical cameras, thermal cameras, imager sensors, ultrasonic sensors, inertial measurement units, global positioning systems, navigation systems, and/or other sensors.

For example, radar devices can process electromagnetic waves reflected from objects to generate radar data that indicates the presence, direction, distance, and speed of objects within the field of view. A radar filtering and preprocessing module can pre-process the radar data to remove things like stationary objects, objects in undriveable areas (like radar returns from buildings) and noisy measurements/interference (e.g., due to velocity) to generate preprocessed radar data. Radar tracking can then further process the preprocessed radar data to generate the radar tracking information, which can then be used to track objects.

Cameras (or image sensors) can be spaced to provide three-hundred and sixty (360) degree image coverage of the environment surrounding the vehicle 10. The cameras capture images (e.g., image frames) and output image data (e.g., a distorted, YUV format image), which can then be processed to generate rectified (or undistorted) camera images. An image preprocessing module can process the image data by undistorting/rectifying it, preprocessing the rectified image data (e.g., image resizing and mean subtraction), and converting the rectified, pre-processed image data into rectified camera images (e.g., having a normal RGB format) that a neural network of an image classification module can classify. The image data can be rectified to correct distortions in the image can cause lines that are straight (in reality) to appear curved, for example, if point clouds in 3D space were projected onto the unrectified image data, they might actually be in the wrong place in the image because of the distortions. By rectifying the image, the projections from 3D space correspond to the correct parts of the image. The rectified camera images can then be sent to an image classification module along with other inputs including three-dimensional locations of objects from an object tracking module, and processed to generate the image classification data that can be provided to an object classification module and used to generate object classification data, which can then be sent to an object tracking module that processes the objects, the radar tracking information, and object classification data to generate object tracking information.

Lidar devices perform a scan by illuminating a target with pulses of laser light, and measure distance to a target by receiving reflected pulses back. The intensity of the reflected pulses can be collectively used by the lidar devices to generate a lidar point cloud that represents the spatial structure/characteristics of objects within the field of view. For instance, the lidar devices can use rotating laser beams that rotate to scan three-hundred and sixty (360) degrees around the vehicle. Alternatively, the lidar devices can oscillate back and forth at a certain scan frequency (i.e., how fast they oscillate) and emit pulses at a repetition rate.

Each of the lidar devices receive lidar data and process the lidar data (e.g., packets of lidar return information) to generate a lidar point cloud (e.g., a three-dimensional set of points in a three-hundred and sixty (360) degree zone around the vehicle). Each point has intensity data in addition to a three-dimensional XYZ location. For example, in one implementation, the point cloud includes a first, intermediate and last returned from each laser pulse. The lidar devices can be synchronized together (or phase locked).

Cameras can be run at their maximum frame rate, and the refresh rate of the cameras is usually much higher than the lidar devices. As lidar spins clockwise from the back of the vehicle, each camera captures images in a clockwise order during the lidar device's rotation. An extrinsic calibration procedure can provide information regarding where the cameras are pointing. The lidar devices are phase locked (i.e., scheduled to be in certain rotational positions at certain times) so it is known when the lidar devices scan certain parts of their cycle. For analysis of a scene, the system can determine which imager/camera is aligned at a point in time when certain lidar data was acquired. The system can the select whatever image was sampled/obtained closest to the point in time during which the lidar data was acquired such that only images that were captured near a certain target time (i.e., when the lidar device is looking at the same region that a camera is pointing) will be processed. As a result, camera-lidar pairs with excellent alignment can be determined. This gives lidar data at a certain heading/orientation along with corresponding image data for the scene/environment at that heading/orientation.

Lidar data of the lidar point clouds acquired by the lidar devices can be fused into a single lidar point cloud. Three-dimensional point sampling can then be performed to pre-process the lidar data (of the single lidar point cloud) to generate a set of three-dimensional points, which can then be segmented by an object segmentation module into objects that can be classified and tracked. For instance, an object classification module can include multiple classifiers that classify the objects to generate object classification data. An object tracking module can track the objects. Tracking information can then be used along with the radar tracking information and the object classification data to generate object tracking information (e.g., temporal tracking information for objects such as location, geometry, speed, etc. of objects in the environment).

The actuator system 90 includes one or more actuator devices 42a-42n that control one or more vehicle features such as, but not limited to, the propulsion system 20, the transmission system 22, a throttle system (not illustrated), the steering system 24, and the brake system 26. As will be explained below, a low-level controller processes control signals from a vehicle control module to generate commands that control one or more of these actuator devices 42a-42n in accordance with the control signals 172 to schedule and execute one or more control actions to be performed to automatically control the autonomous vehicle and automate the autonomous driving task encountered in the particular driving scenario (e.g., to achieve one or more particular vehicle trajectory and speed profiles). In addition, in some embodiments, the vehicle features can further include interior and/or exterior vehicle features such as, but are not limited to, doors, a trunk, and cabin features such as air, music, lighting, etc. (not numbered).

Figure 2:
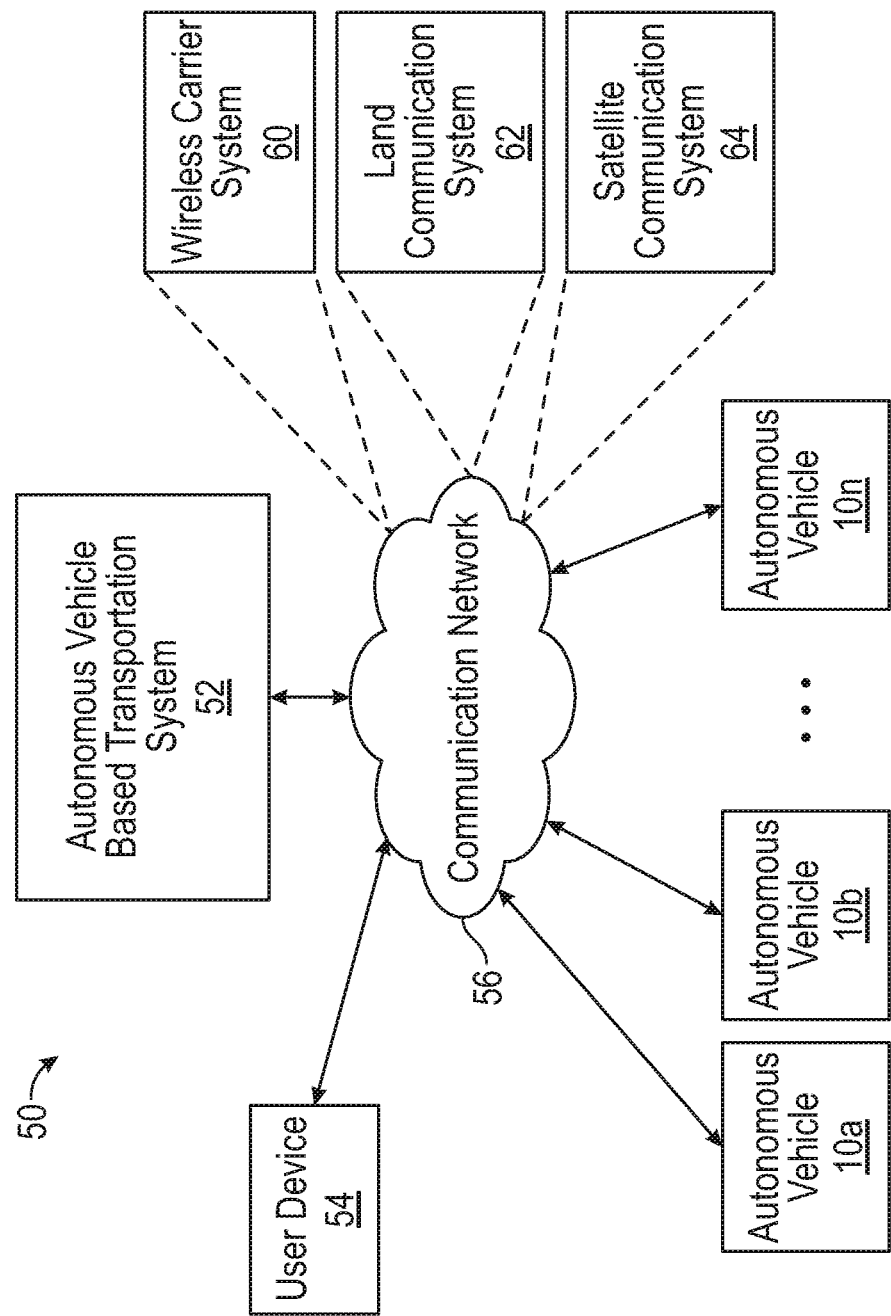
FIG. 2 is a functional block diagram illustrating a transportation system having one or more autonomous vehicles of FIG. 1 in accordance with the disclosed embodiments.

The communication system 36 is configured to wirelessly communicate information to and from other entities 48, such as but not limited to, other vehicles ("V2V" communication,) infrastructure ("V2I" communication), remote systems, and/or personal devices (described in more detail with regard to FIG. 2). In an exemplary embodiment, the communication system 36 is a wireless communication system configured to communicate via a wireless local area network (WLAN) using IEEE 802.11 standards or by using cellular data communication. However, additional or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards.

The data storage device 32 stores data for use in automatically controlling the autonomous vehicle 10. In various embodiments, the data storage device 32 stores defined maps of the navigable environment. In various embodiments, the defined maps may be predefined by and obtained from a remote system (described in further detail with regard to FIG. 2). For example, the defined maps may be assembled by the remote system and communicated to the autonomous vehicle 10 (wirelessly and/or in a wired manner) and stored in the data storage device 32. As can be appreciated, the data storage device 32 may be part of the controller 34, separate from the controller 34, or part of the controller 34 and part of a separate system.

The controller 34 includes at least one processor 44 and a computer readable storage device or media 46. The processor 44 can be any custom made or commercially available processor, a central processing unit (CPU), a graphics processing unit (GPU), an auxiliary processor among several processors associated with the controller 34, a semi-conductor based microprocessor (in the form of a microchip or chip set), a macroprocessor, any combination thereof, or generally any device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 46 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 34 in controlling the autonomous vehicle 10.

The instructions may include one or more separate programs, each of which comprises an ordered listing of executable instructions for implementing logical functions. The instructions, when executed by the processor 44, receive and process signals from the sensor system 28, perform logic, calculations, methods and/or algorithms for automatically controlling the components of the autonomous vehicle 10, and generate control signals to the actuator system 90 to automatically control the components of the autonomous vehicle 10 based on the logic, calculations, methods, and/or algorithms. Although only one controller 34 is shown in FIG. 1, embodiments of the autonomous vehicle 10 can include any number of controllers 34 that communicate over any suitable communication medium or a combination of communication mediums and that cooperate to process the sensor signals, perform logic, calculations, methods, and/or algorithms, and generate control signals to automatically control one or more actuator devices 42a-42n that control one or more vehicle features of the autonomous vehicle 10.

In various embodiments, one or more instructions of the controller 34 are embodied in a high-level controller of an autonomous driving system (ADS) and, when executed by the processor 44, can decompose the autonomous driving task into a sequence of sub-tasks that address the particular driving scenario and select a particular combination of sensorimotor primitive modules to be enabled and executed for the particular driving scenario that each address a sub-task. Each of the sensorimotor primitive modules generates a vehicle trajectory and speed profile, and at least one of the vehicle trajectory and speed profiles can be processed to generate the control signals that are processed by a low-level controller to generate commands that control one or more of actuators of the autonomous vehicle to execute one or more control actions to automatically control the autonomous vehicle (e.g., to automate the autonomous driving task encountered in the particular driving scenario).

With reference now to FIG. 2, in various embodiments, the autonomous vehicle 10 described with regard to FIG. 1 may be suitable for use in the context of a taxi or shuttle system in a certain geographical area (e.g., a city, a school or business campus, a shopping center, an amusement park, an event center, or the like) or may simply be managed by a remote system. For example, the autonomous vehicle 10 may be associated with an autonomous vehicle based remote transportation system. FIG. 2 illustrates an exemplary embodiment of an operating environment shown generally at 50 that includes an autonomous vehicle based remote transportation system 52 that is associated with one or more autonomous vehicles 10a-10n as described with regard to FIG. 1. In various embodiments, the operating environment 50 further includes one or more user devices 54 that communicate with the autonomous vehicle 10 and/or the remote transportation system 52 via a communication network 56.

The communication network 56 supports communication as needed between devices, systems, and components supported by the operating environment 50 (e.g., via tangible communication links and/or wireless communication links). For example, the communication network 56 can include a wireless carrier system 60 such as a cellular telephone system that includes a plurality of cell towers (not shown), one or more mobile switching centers (MSCs) (not shown), as well as any other networking components required to connect the wireless carrier system 60 with a land communications system. Each cell tower includes sending and receiving antennas and a base station, with the base stations from different cell towers being connected to the MSC either directly or via intermediary equipment such as a base station controller. The wireless carrier system 60 can implement any suitable communications technology, including for example, digital technologies such as CDMA (e.g., CDMA2000), LTE (e.g., 4G LTE or 5G LTE), GSM/GPRS, or other current or emerging wireless technologies. Other cell tower/base station/MSC arrangements are possible and could be used with the wireless carrier system 60. For example, the base station and cell tower could be co-located at the same site or they could be remotely located from one another, each base station could be responsible for a single cell tower or a single base station could service various cell towers, or various base stations could be coupled to a single MSC, to name but a few of the possible arrangements.

Apart from including the wireless carrier system 60, a second wireless carrier system in the form of a satellite communication system 64 can be included to provide uni-directional or bi-directional communication with the autonomous vehicles 10a-10n. This can be done using one or more communication satellites (not shown) and an uplink transmitting station (not shown). Uni-directional communication can include, for example, satellite radio services, wherein programming content (news, music, etc.) is received by the transmitting station, packaged for upload, and then sent to the satellite, which broadcasts the programming to subscribers. Bi-directional communication can include, for example, satellite telephony services using the satellite to relay telephone communications between the vehicle 10 and the station. The satellite telephony can be utilized either in addition to or in lieu of the wireless carrier system 60.

A land communication system 62 may further be included that is a conventional land-based telecommunications network connected to one or more landline telephones and connects the wireless carrier system 60 to the remote transportation system 52. For example, the land communication system 62 may include a public switched telephone network (PSTN) such as that used to provide hardwired telephony, packet-switched data communications, and the Internet infrastructure. One or more segments of the land communication system 62 can be implemented through the use of a standard wired network, a fiber or other optical network, a cable network, power lines, other wireless networks such as wireless local area networks (WLANs), or networks providing broadband wireless access (BWA), or any combination thereof. Furthermore, the remote transportation system 52 need not be connected via the land communication system 62, but can include wireless telephony equipment so that it can communicate directly with a wireless network, such as the wireless carrier system 60.

Although only one user device 54 is shown in FIG. 2, embodiments of the operating environment 50 can support any number of user devices 54, including multiple user devices 54 owned, operated, or otherwise used by one person. Each user device 54 supported by the operating environment 50 may be implemented using any suitable hardware platform. In this regard, the user device 54 can be realized in any common form factor including, but not limited to: a desktop computer; a mobile computer (e.g., a tablet computer, a laptop computer, or a netbook computer); a smartphone; a video game device; a digital media player; a piece of home entertainment equipment; a digital camera or video camera; a wearable computing device (e.g., smart watch, smart glasses, smart clothing); or the like. Each user device 54 supported by the operating environment 50 is realized as a computer-implemented or computer-based device having the hardware, software, firmware, and/or processing logic needed to carry out the various techniques and methodologies described herein. For example, the user device 54 includes a microprocessor in the form of a programmable device that includes one or more instructions stored in an internal memory structure and applied to receive binary input to create binary output. In some embodiments, the user device 54 includes a GPS module capable of receiving GPS satellite signals and generating GPS coordinates based on those signals. In other embodiments, the user device 54 includes cellular communications functionality such that the device carries out voice and/or data communications over the communication network 56 using one or more cellular communications protocols, as are discussed herein. In various embodiments, the user device 54 includes a visual display, such as a touch-screen graphical display, or other display.

The remote transportation system 52 includes one or more backend server systems, which may be cloud-based, network-based, or resident at the particular campus or geographical location serviced by the remote transportation system 52. The remote transportation system 52 can be manned by a live advisor, or an automated advisor, or a combination of both. The remote transportation system 52 can communicate with the user devices 54 and the autonomous vehicles 10a-10n to schedule rides, dispatch autonomous vehicles 10a-10n, and the like. In various embodiments, the remote transportation system 52 stores account information such as subscriber authentication information, vehicle identifiers, profile records, behavioral patterns, and other pertinent subscriber information.

In accordance with a typical use case workflow, a registered user of the remote transportation system 52 can create a ride request via the user device 54. The ride request will typically indicate the passenger's desired pickup location (or current GPS location), the desired destination location (which may identify a predefined vehicle stop and/or a user-specified passenger destination), and a pickup time. The remote transportation system 52 receives the ride request, processes the request, and dispatches a selected one of the autonomous vehicles 10a-10n (when and if one is available) to pick up the passenger at the designated pickup location and at the appropriate time. The remote transportation system 52 can also generate and send a suitably configured confirmation message or notification to the user device 54, to let the passenger know that a vehicle is on the way.

As can be appreciated, the subject matter disclosed herein provides certain enhanced features and functionality to what may be considered as a standard or baseline autonomous vehicle 10 and/or an autonomous vehicle based remote transportation system 52. To this end, an autonomous vehicle and autonomous vehicle based remote transportation system can be modified, enhanced, or otherwise supplemented to provide the additional features described in more detail below.

Figure 3:
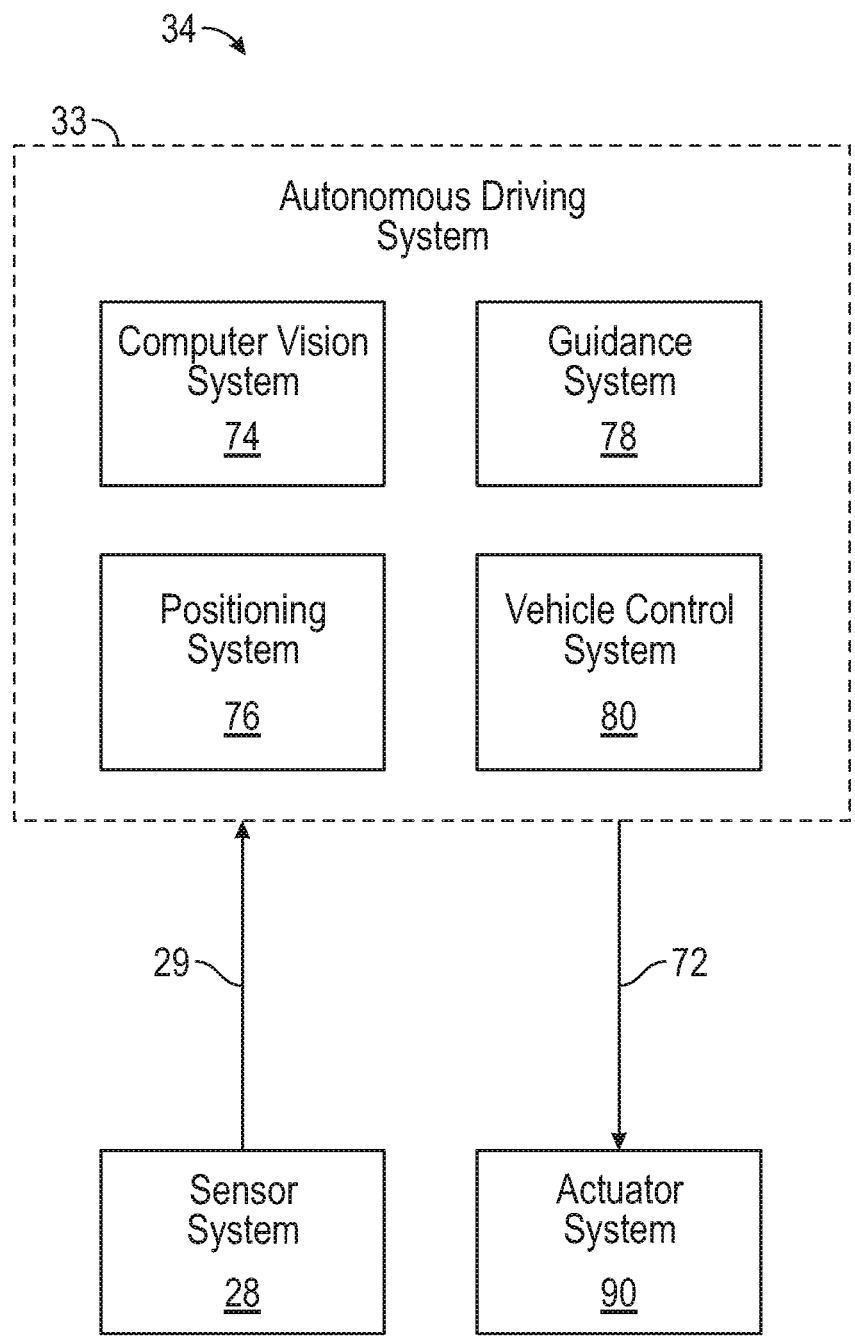
FIG. 3 is a dataflow diagram illustrating an autonomous driving system of the autonomous vehicle in accordance with the disclosed embodiments.

In accordance with various embodiments, the controller 34 implements a high-level controller of an autonomous driving system (ADS) 33 as shown in FIG. 3. That is, suitable software and/or hardware components of the controller 34 (e.g., the processor 44 and the computer-readable storage device 46) are utilized to provide a high-level controller of an autonomous driving system 33 that is used in conjunction with vehicle 10. The high-level controller of the autonomous driving system 33 will be described in greater detail below with reference to FIGS. 4 and 5

In various embodiments, the instructions for the high-level controller of the autonomous driving system 33 may be organized by function, module, or system. For example, as shown in FIG. 3, the high-level controller of the autonomous driving system 33 can include a computer vision system 74, a positioning system 76, a guidance system 78, and a vehicle control system 80. As can be appreciated, in various embodiments, the instructions may be organized into any number of systems (e.g., combined, further partitioned, etc.) as the disclosure is not limited to the present examples.

In various embodiments, the computer vision system 74 synthesizes and processes sensor data and predicts the presence, location, classification, and/or path of objects and features of the environment of the vehicle 10. In various embodiments, the computer vision system 74 can incorporate information from multiple sensors, including but not limited to cameras, lidars, radars, and/or any number of other types of sensors. The positioning system 76 processes sensor data along with other data to determine a position (e.g., a local position relative to a map, an exact position relative to lane of a road, vehicle heading, velocity, etc.) of the vehicle 10 relative to the environment. The guidance system 78 processes sensor data along with other data to determine a path for the vehicle 10 to follow. The vehicle control system 80 generates control signals 72 for controlling the vehicle 10 according to the determined path.

In various embodiments, the controller 34 implements machine learning techniques to assist the functionality of the controller 34, such as feature detection/classification, obstruction mitigation, route traversal, mapping, sensor integration, ground-truth determination, and the like.

Figure 4:
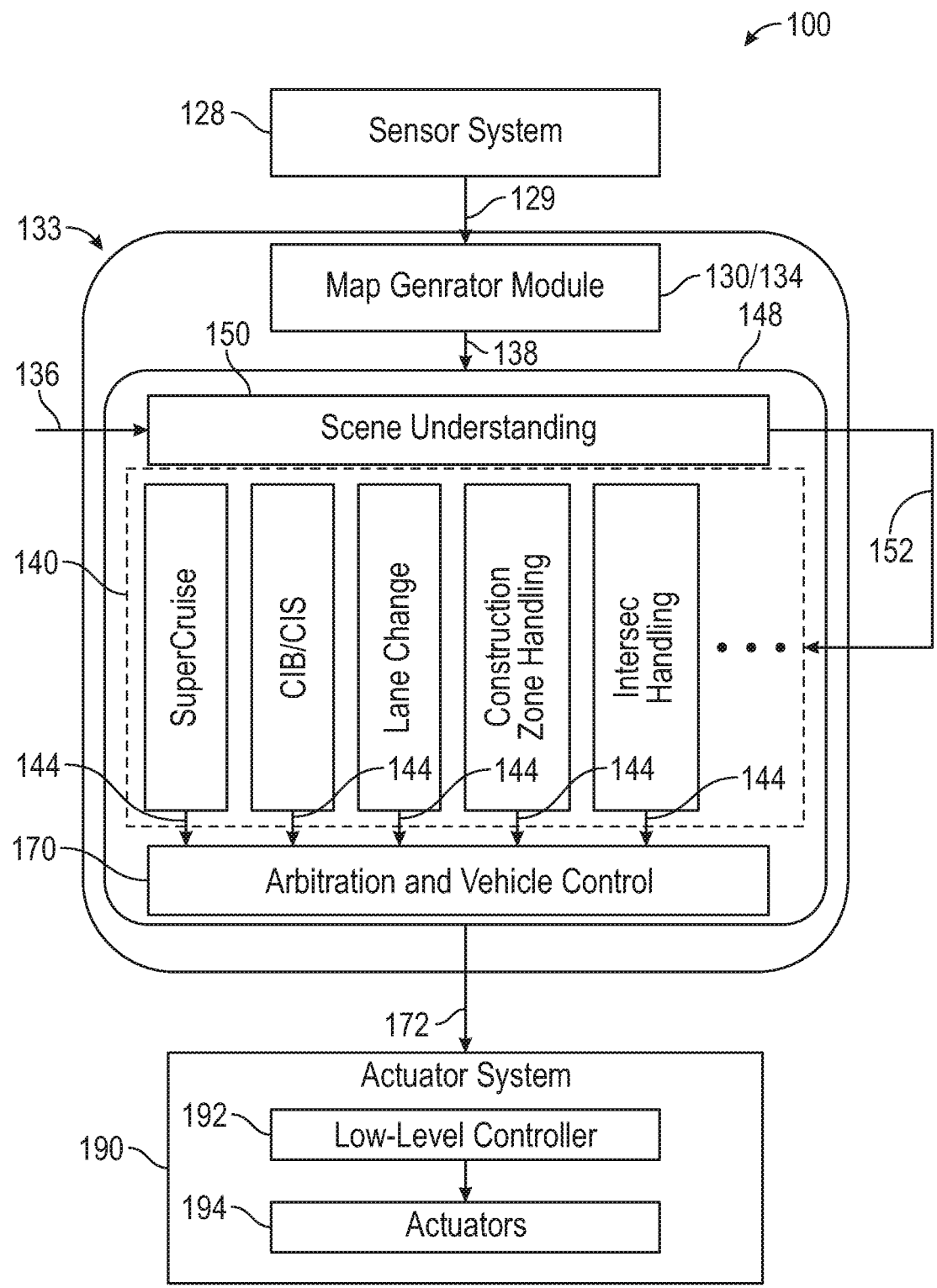
FIG. 4 is a block diagram that illustrates a vehicle control system in accordance with the disclosed embodiments.

As mentioned briefly above, the high-level controller of the ADS 33 is included within the controller 34 of FIG. 1, and as shown in more detail in FIG. 4 and with continued reference to FIG. 3, can be used to implement portions of a vehicle control system 100 that includes the sensor system 128, which may correspond to sensor system 28 of FIG. 3 in some embodiments, the high-level controller 133 of the ADS 33, and the actuator system 190, which may correspond to actuator system 90 of FIG. 3 in some embodiments.

FIG. 4 is a block diagram that illustrates a vehicle control system 100 in accordance with the disclosed embodiments. The vehicle control system 100 can provide be implemented as part of the ADS 33 of FIG. 3. The vehicle control system 100 includes a sensor system 128 that is configured to provide sensor data 129, a high-level controller 133, and an actuator system 190 that receives control signals 172 generated by the high-level controller 133.

As described above, the sensor system 128 can include technologies such as cameras, radars, lidars, etc. Although not shown in FIG. 4, the high-level controller 133 can also receive inputs 136 from other systems including, but not limited to a guidance system including a navigation system and a positioning system (not illustrated).

The high-level controller 133 includes a map generator module 130, 134 and a vehicle controller module 148. The vehicle controller module 148 includes memory 140 that stores a plurality or ensemble of sensorimotor primitive modules, a scene understanding module 150 and an arbitration and vehicle control module 170.

The map generator module 130, 134 is configured to process the sensor data to generate a world representation 138 of a particular driving scenario as represented by the sensor data at a particular instant of time. In one embodiment that will be described in greater detail below, the world representation 138 includes a perception map and a feature map. The world representation 138 is provided to the vehicle controller module 148. Memory 140 is configured to store a plurality or ensemble of sensorimotor primitive modules 142A, 142B.

Sensorimotor Primitive Modules

Each sensorimotor primitive module 142 includes computer-executable instructions that, when executed by a computer processor, can generate a corresponding vehicle trajectory and speed profile that can be processed further and used to generate control signals 172 and commands that automatically control the autonomous vehicle to cause the autonomous vehicle to perform a specific driving maneuver or skill. Each sensorimotor primitive module represents a specific, self-contained or indivisible driving maneuver/skill that can be embodied in a vehicle via learning or programming. For example, in one embodiment, at least some of the sensorimotor primitive modules are developed through machine learning algorithms that can be tuned to optimize performance. For instance, learnt sensorimotor primitive modules can be developed through machine learning algorithms by data mining of relatively cheap human driving data.

Although FIG. 4 illustrates five non-limiting examples of sensorimotor primitive modules: SuperCruise, collision imminent brake/collision imminent steering (CIB/CIS), Lane Change, Construction Zone Handling, and Intersection Handling it should be noted that this depiction is for illustration purposes only. SuperCruise is a product of GM Cadillac CT6 that describes level-2 autonomous driving within single lane of a freeway. CIB/CIS are examples of reactive collision avoidance maneuvers or primitives. While only five examples of sensorimotor primitive modules are illustrated in FIG. 4, it should be appreciated that the memory 140 can include any number of sensorimotor primitive modules. For instance, a few other non-limiting examples of sensorimotor primitive modules can include, but are not limited to, collision mitigation brake (CMB), adaptive cruise control (ACC), lane following, intersection right turn, intersection left turn, Michigan left turn, "U" turn, highway merging, highway exiting, yielding, parking, roundabout handling, shopping mall parking lot handling, exit shopping plaza, entering shopping plaza, etc. CMB is a primitive module that is applied when a collision is unavoidable to automatically send a harsh brake command to the brake actuator to reduce impact energy. ACC is a convenience feature that provides longitudinal vehicle control such that the host vehicle will maintain a constant headway from the preceding vehicle.

Each sensorimotor primitive module can map sensing in an environment (as represented by the navigation route data and GPS data 136, and the world representation 138) to one or more action(s) that accomplishes a specific vehicle maneuver. Each sensorimotor primitive module can be used to generate control signals and actuator commands that address a specific driving scenario (e.g., combination of sensed environment, location and navigation goals as represented by the navigation route data and GPS data 136, and the world representation 138, etc.) encountered during operation of an autonomous vehicle. For example, each sensorimotor primitive module 142 maps information from the world representation 138 to a particular vehicle trajectory and speed profile, and each vehicle trajectory and speed profile maps to one or more control signals that translate or map to actuator commands which cause one or more control actions that automatically control the autonomous vehicle. The control actions cause the autonomous vehicle to perform a specific driving maneuver that addresses the particular driving scenario encountered during the autonomous driving task and operation of the autonomous vehicle. Each of the sensorimotor primitive modules 142 is "location agnostic" meaning that they are capable of operating in any location and in any number of different environments (e.g., the skills learnt for handling roundabout are applicable to any roundabout encountered by the autonomous vehicle).

In one embodiment, each sensorimotor primitive modules can be categorized into two different classes or types including: predicate logic (PL) or model predictive control (MPC) sensorimotor primitive modules, and learnt sensorimotor primitive modules. PL or MPC sensorimotor primitive modules can be expressed in relatively simple logic; however, a relatively reliable/sophisticated perception function is needed to map sensor data to symbols (e.g., closest preceding in-lane vehicle). PL and MPC sensorimotor primitive modules rely on input from the perception map that has the detected objects and their related measured attributes (e.g., distance, speed), where each detected object can be treated as a symbol. By contrast, learnt sensorimotor primitive modules are another type of sensorimotor primitive module that can be used to directly map a feature map to control action(s) (e.g., that result in a particular vehicle trajectory and speed profile). In other words, the learnt sensorimotor primitive modules directly map the feature map to a trajectory for vehicle control.

Predicate logic (PL) sensorimotor primitive modules are generally more useful for implementing safety-related reactive primitives. A PL sensorimotor primitive module maps the sensor data, via a perception map, to one or more safety-related sub-tasks of the autonomous driving task, and maps each of the safety-related sub-tasks to one or more control signals. The one or more control signals each cause one or more control actions that automatically control the autonomous vehicle to cause the autonomous vehicle to perform a specific safety-related driving maneuver that addresses the particular driving scenario encountered during operation of the autonomous vehicle. PL sensorimotor primitive modules are relatively simple but highly reliable. As an example, collision imminent brake (CM) is a PL-type SPM that can be used to apply an emergency brake if the time-to-collision of preceding vehicle is less than a threshold time. For instance, if the time-to-collision is less than a threshold (e.g., 0.6 second), a harsh brake command is sent (e.g., if time-to-collision (preceding veh)<0.6 second=true, apply brake). Other PL sensorimotor primitive modules can include, for example, a side blind zone alert system. In this system, if there exist a vehicle inside of the driver's blind zone and a lane change maneuver is planned, then the lane change maneuver is aborted.

Model predictive control (MPC) sensorimotor primitive modules are generally more appropriate for implementing convenience features requiring a well-defined reference target (e.g., continuous close-loop control once engaged). A model predictive control (MPC) sensorimotor primitive module maps the sensor data, via the perception map, to one or more convenience-related sub-tasks of the autonomous driving task, and maps each of the convenience-related sub-tasks to one or more control signals. The one or more control signals each cause one or more control actions that automatically control the autonomous vehicle to cause the autonomous vehicle to perform a specific convenience-related driving maneuver that (1) has a reference target and (2) addresses the particular driving scenario encountered during operation of the autonomous vehicle. Examples of MPC sensorimotor primitive modules can include, for example, adaptive cruise control (ACC), SuperCruise, etc. As one example, ACC is a MPC-type SPM that can be applied to maintain a specific headway from the closest preceding in-lane vehicle if existing (e.g., |headway (closest preceding in-lane veh)−reference|<ε). Other MPC sensorimotor primitive modules can include, for example, collision imminent steering (CIS). For example, in CIS, if an object exists in the collision path of the host vehicle, and maximal braking cannot avoid the collision due to insufficient distance, and there is room and safe in adjacent lanes (or road shoulder), then a trajectory and speed profile is generated to move the host vehicle to the next lane.

Learnt sensorimotor primitive modules can be used in more challenging cases where there is no well-defined target or control function (e.g., intersection handling w/o lane markings) because they can provide flexibility. A learnt sensorimotor primitive module directly maps scene elements of a feature map to one or more control signals that each cause one or more control actions that automatically control the autonomous vehicle to cause the autonomous vehicle to perform a specific driving maneuver that (1) has no reference target or control function and (2) addresses the particular driving scenario encountered during operation of the autonomous vehicle. Learnt sensorimotor primitive modules need a certain amount of data for training. Transfer learning can lessen the data demands. Transfer learning is the process of taking a pre-trained model (the weights and parameters of a neural network that has been trained on a large dataset by another entity) and "fine-tuning" the model with another dataset. The pre-trained model will act as a feature extractor. The last layer of the neural network can be removed and replaced with another classifier. The weights of all the other layers of the neural network can be frozen (i.e., so that the weights do not change during gradient descent/optimization) and the neural network can be trained normally.

Scene Understanding Module

Given the same sensor data input (i.e., feature map), different sensorimotor primitive modules in the ensemble produces different trajectories and speed profiles. In the ensemble of sensorimotor primitive modules, most of the sensorimotor primitive modules are just the candidates to be enabled or selected by scene understanding module. In general terms, the scene understanding module 150 is responsible for selecting, based on the driving destination and current perception of the environment, the particular ones of the sensorimotor primitive modules to be executed. The output (e.g., vehicle trajectory and speed profile) of each sensorimotor primitive module that is selected by the scene understanding module may be used by vehicle control module to control the vehicle. As such, the scene understanding module is the central gluing logic. With the mission context produced internally, it creates a sequence of primitives to be selected and executed such that the autonomous vehicle can safely reach the destination while keep the passengers/driver experience as pleasant as possible.

A particular driving scenario or scene that is encountered (as represented by the navigation route data and GPS data 136, and the world representation 138) can be addressed by decomposing that particular driving scenario into a sequence control actions. Each control action controls the vehicle's trajectory and speed to accomplish a particular sub-task. Collectively the sequence control actions control the vehicle to achieve a desired path over a period of time. Different combinations of the sensorimotor primitive modules can be activated (or deactivated) to decompose the autonomous driving task into the sequence of sub-tasks. As will be explained in greater detail below, based on a particular driving scenario (as represented, for example, by the navigation route data and GPS data 136 and the world representation 138), the scene understanding module 150 can globally assess the particular driving scenario and decompose an autonomous driving task into a sequence of sub-tasks. The scene understanding module 150 can then output enable signals 152 to select a particular combination of one or more of the sensorimotor primitive modules to activate or enable for that particular driving scenario (referred to below as activated/enabled sensorimotor primitive modules), where each sub-task in the sequence can be addressed by executing one or more of the sensorimotor primitive modules that has been activated/enabled.

To explain further, the scene understanding module 150 receives a feature map (which is part of the world representation 138 and will be described in greater detail below) and other input data 136 including navigation route data that indicates a route of the vehicle from a navigation system, and location/position information from a positioning system that indicates location of the vehicle. The scene understanding module 150 processes the navigation route data (that indicates a route of the vehicle), the position information (that indicates location of the vehicle) and the feature map (that indicates the processed raw-level data directly from sensors that represents the information regarding the traffic conditions and road geometry and topology) to define an autonomous driving task, and can then decompose the autonomous driving task into a sequence of sub-tasks that address the particular driving scenario. The scene understanding module 150 can then select a particular combination or subset 142A', 142B' of the sensorimotor primitive modules 142A, 142B that are to be enabled and executed to address the particular driving scenario and generate a combination of enable signals 152 that identifies those particular ones 142A', 142B' of the sensorimotor primitive modules. For example, in one embodiment, each one of the particular combination 142A', 142B' of the sensorimotor primitive modules can address one or more of the sub-tasks in the sequence. Thus, the scene understanding module 150 globally assesses the driving scenario (as represented by the navigation route data and GPS data 136, and feature map) and then based on the global assessment of the driving scenario generates and outputs enable signals 152 to activate or enable particular combination or subset 142A', 142B' of the sensorimotor primitive modules for that particular driving scenario. As such, the sensorimotor primitive modules can collectively allow for implementation of an ADS 33 to enable autonomous driving without the need for high-definition maps or high-precision GPS equipment.

Figure 5:
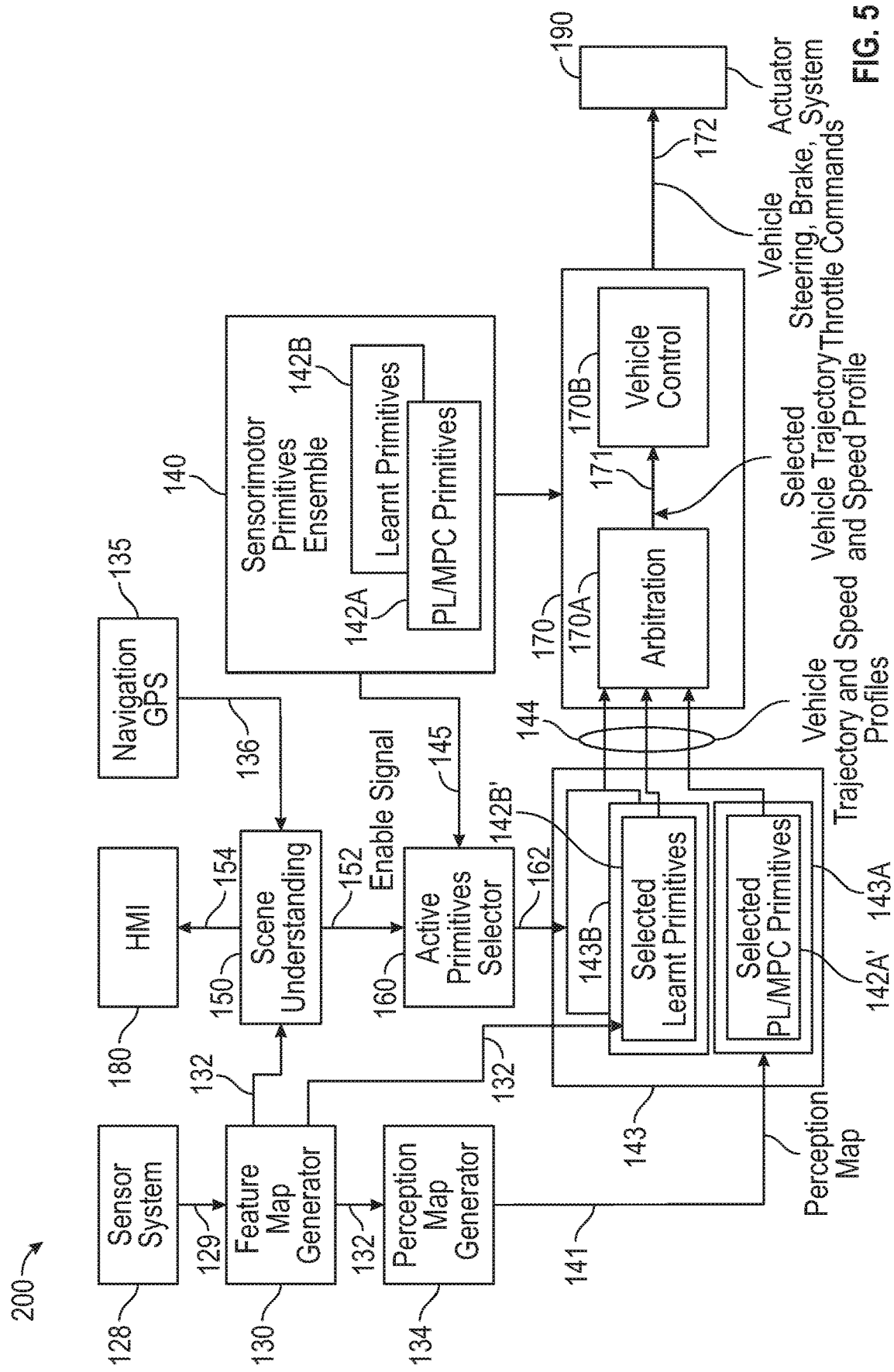
FIG. 5 is a block diagram that illustrates another vehicle control system in accordance with one implementation of the disclosed embodiments.

Each of the sensorimotor primitive modules (of particular combination 142A', 142B' of the sensorimotor primitive modules) that are selected and enabled are executed to generate a corresponding vehicle trajectory and speed profile that are collectively represented in FIG. 5 as the vehicle trajectory and speed profiles 144. Each vehicle trajectory and speed profile can define a path that the vehicle can potentially travel over if followed. As will be described below with reference to FIG. 9B, each vehicle trajectory and speed profile includes information that specifies longitudinal distance (x), lateral distance (y), heading (θ), and desired velocity (v) of the vehicle that will travel through in future time instants.

Arbitration and Vehicle Control Module

The arbitration and vehicle control module 170 performs both arbitration functions and vehicle control functions. The arbitration and vehicle control module 170 can help determine priorities for executing the vehicle trajectory and speed profiles 144 and ensure smooth vehicle control during transition. For example, the arbitration and vehicle control module 170 processes the vehicle trajectory and speed profiles 144 by applying priority logic rules for that particular driving scenario (as determined by the scene understanding module 150 based on the navigation route data and GPS data 136 and the feature map) to define a priority order for execution for each of the vehicle trajectory and speed profiles 144, and selects one of the vehicle trajectory and speed profiles 171 having the highest priority ranking(s) for execution that will be used to generate control signals 172 (e.g., steering torque or angle signals used to generate corresponding steering torque or angle commands, and brake/throttle control signals used to generate acceleration commands) that are sent to the actuator system 190. As such, the priority logic rules prioritize the vehicle trajectory and speed profiles 144 that are associated with certain sensorimotor primitive modules (of particular combination 142A', 142B' of the sensorimotor primitive modules that are selected and enabled) over other sensorimotor primitive modules.

Accordingly, the vehicle trajectory and speed profiles 144 generated by some of the activated/enabled sensorimotor primitive modules for that particular driving scenario may or may not be applied and the arbitration and vehicle control module 170 decides which ones of the vehicle trajectory and speed profiles 144 will be selected to be applied for that particular driving scenario, and the order in which they will be applied. The relative priority of each of the vehicle trajectory and speed profiles 144 generated by the sensorimotor primitive modules can be set/defined by system designer. For example, priority logic rules can prioritize (rank or prefer) safety-related reactive sensorimotor primitive modules over other sensorimotor primitive modules.

Actuator System

The control signals 172 are then provided to the actuator system 190, which processes the control signals 172 to generate the appropriate commands to control various vehicle systems and subsystems. In this embodiment, the actuator system 190 includes a low-level controller 192 and a plurality of actuators 194 of the vehicle (e.g., a steering torque or angle controller, a brake system, a throttle system, etc.).

The low-level controller 192 processes the control signals 172 from the vehicle control module 170B to generate commands that control the actuators 194 in accordance with the control signals 172 to schedule and execute one or more control actions to be performed to automate driving tasks. The control signals 172 specify or map to control actions and parameters that are used to schedule the one or more scheduled actions to be performed to automate driving tasks. The one or more control actions automatically control the autonomous vehicle to automate an autonomous driving task encountered in a particular driving scenario and achieve a particular selected one of vehicle trajectory and speed profiles 171.

FIG. 5 is a block diagram that illustrates another vehicle control system 200 in accordance with the disclosed embodiments. The vehicle control system 100 can provide be implemented as part of the ADS 33 of FIG. 3. FIG. 5 will be described with continued reference to FIG. 4. FIG. 5 includes many of the same elements already described above with reference to FIG. 4, and for sake of brevity those elements will not be described again with reference to FIG. 5. In addition to the modules illustrated in FIG. 4, the vehicle control system 200 of FIG. 5 also includes a feature map generator module 130 and a perception map generator module 134 that are sub-modules of the map generator module 130, 134 of FIG. 4, a navigation routing system and a locationing/positioning system (e.g., a GPS), which are collectively shown in block 135, a primitive processor module 143, a selector module 160, an arbitration module 170A and a vehicle control module 170B that are sub-modules of the arbitration and vehicle control module 170, and a human-machine interface (HMI) 180 that is used to display output information that is generated based on information 154 output by the scene understanding module 150.

The feature map generator module 130 generates a feature map 132 based on the sensor data 129. The perception map generator module 134 detects objects, based on the feature map, classifies the detected objects according to semantic classes (e.g., pedestrians, vehicles, etc.), and generates the perception map 141, which includes stixels that approximate object boundaries that are detected, bounding box sizes, locations, orientations and velocities of detected objects that are detected from the perception map 141, road features for the environment as indicated by the perception map 141, and freespace features for the environment as indicated by the perception map 141. In this embodiment, the world representation 138 of FIG. 4 includes the feature map 132 and the perception map 141.

In this embodiment, the scene understanding module 150 processes the feature map 132 and other input data 136 (including navigation route data that indicates a route of the vehicle from a navigation system, and location/position information from a positioning system that indicates location of the vehicle) to generate a combination of enable signals 152 that identifies the particular combination 142A', 142B' of the sensorimotor primitive modules. In one embodiment, the scene understanding module is implemented using a recurrent convolutional neural network that maps a sequence of sensor inputs (feature map 130) to a sequence of enable Boolean signals for the primitives in the ensemble. In one of specific implementation, the scene understanding module is implemented using a long short-term memory (LSTM) neural cell with multiple gates (i.e., input gate, output gate, forget gate) to handle or remember latent factors over an arbitrary time interval.

The scene understanding module 150 sends the combination of enable signals 152 to the selector module 160. Based on the enable signals 152, the selector module 160 retrieves the particular combination 142A', 142B' of the sensorimotor primitive modules from the memory 140 and loads the particular combination 142A', 142B' of the sensorimotor primitive modules at the primitive processor module 143. The primitive processor module 143 can execute the particular combination 142A', 142B' of the sensorimotor primitive modules such that each generates a vehicle trajectory and speed profile, which are collectively represented in FIG. 5 via arrows 144.

The arbitration and vehicle control module 170 includes the arbitration module 170A and the vehicle control module 170B. The arbitration module 170A applies priority logic rules to define a priority order for execution for each of the vehicle trajectory and speed profiles 144, and selects one of the vehicle trajectory and speed profiles 171 having the highest priority ranking for execution. In one embodiment, each primitive has a predefined priority rank set by system designer. For example, in one implementation, a safety related reactive sensorimotor primitive module is ranked higher than these of autonomous driving related sensorimotor primitive module. For example, in a lane change maneuver, two sensorimotor primitive modules might be activated: a lane change sensorimotor primitive module and side blind zone alert sensorimotor primitive module. If the side blind zone alert sensorimotor primitive module generates a valid output (in the case of detecting an object in the blind zone), its output will preempt the output of lane change sensorimotor primitive module, and trigger aborting the lane change sensorimotor primitive module.

The vehicle control module 170B processes the selected one of vehicle trajectory and speed profiles 171 by applying neuromorphic or ordinary differential equation (ODE) control models (described in greater detail below with reference to FIG. 9A) to the selected one(s) of vehicle trajectory and speed profiles 171 to generate the control signals 172. In this regard, it should be noted that primitive processor module 143 can execute multiple sensorimotor primitive modules simultaneously to reduce switching latency, but that only one of the vehicle trajectory and speed profiles 171 will be selected by the arbitration module 170A and executed by and the vehicle control module 170B in priority order at any particular time.

Figure 6:
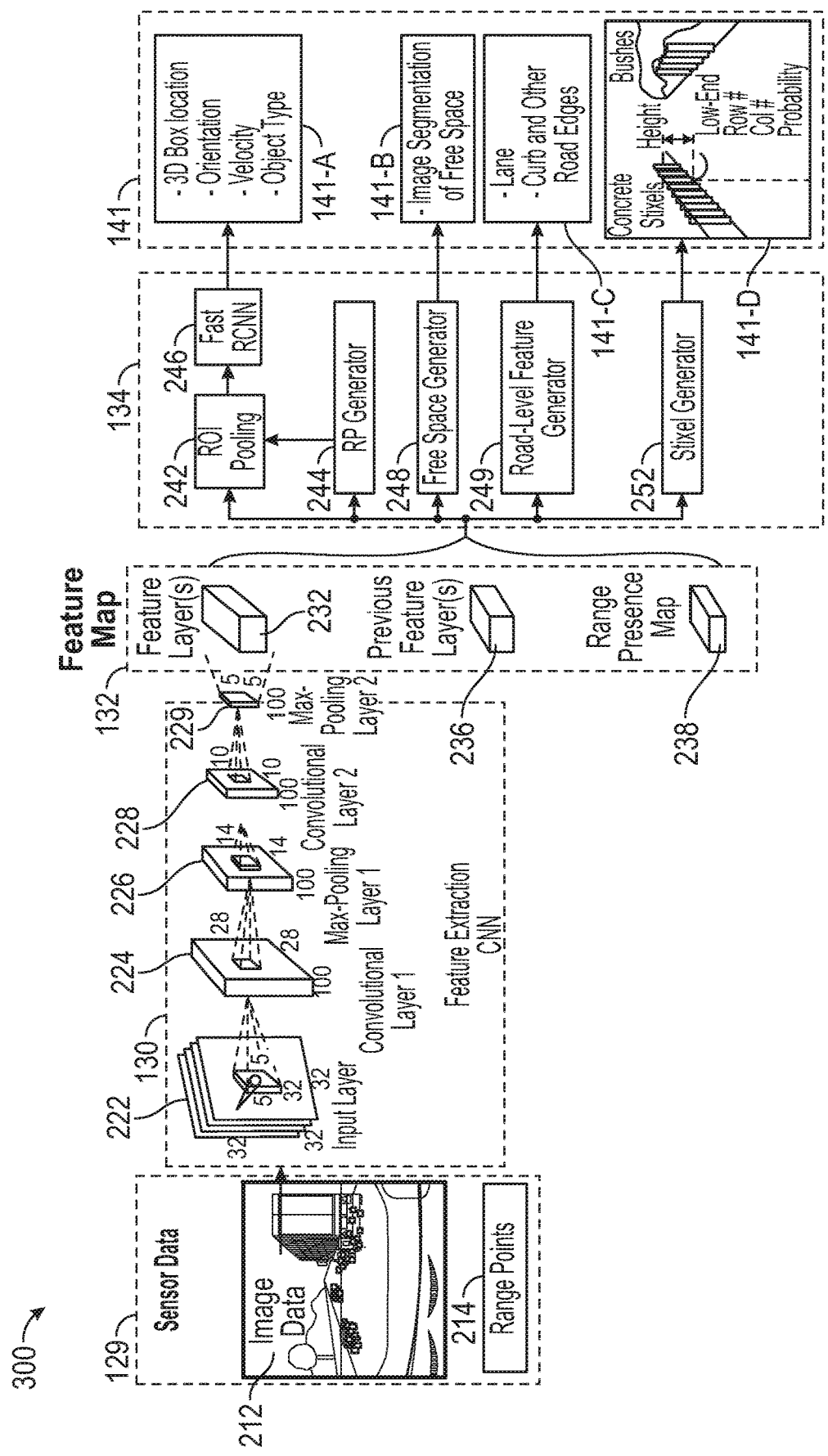
FIG. 6 is a block diagram that illustrates a map generator module of FIG. 5 in accordance with the disclosed embodiments.

FIG. 6 is a block diagram that illustrates a map generator module 300 in accordance with the disclosed embodiments. FIG. 6 will be described with continued reference to FIGS. 4 and 5. The map generator module 300 comprises a two-stage neural network (NN) that includes the feature map generator module 130 and the perception map generator module 134.

A neural network refers to a computing system or processing device that is made up of a number of simple, highly interconnected processing elements/devices/units, which can be implemented using software algorithms and/or actual hardware. The processing elements/devices/units process information by their dynamic state response to external inputs. A neural network can be organized in layers that are made up of a number of interconnected nodes. Each node includes an activation function. Patterns are presented to the network via an input layer, which communicates to one or more 'hidden layers' where the actual processing is done via a system of weighted connections. The hidden layers then link to an output layer where an output is generated. Most NNs contain some form of learning rule, which modifies the weights of the connections according to the input patterns that it is presented with. While each neural network is different, a neural network generally includes at least some of the following components: a set of processing units, the state of activation of a processing unit, the function used to compute output of a processing unit, the pattern of connectivity among processing units, the rule of activation propagation, the activation function, and the rule of learning employed. Design parameters for a neural network can include: the number of input nodes, the number of output nodes, the number of middle or hidden layers, the number of nodes per hidden layer, initial connection weights, the initial node biases, the learning rate, the momentum rate, etc.

A neural network analysis often requires a large number of individual runs to determine the best solution. speed and the momentum of the learning. The speed of learning is actually the rate of convergence between the current solution and the global minimum. Momentum helps the network to overcome obstacles (local minima) in the error surface and settle down at or near the global minimum. Once a neural network is 'trained' to a satisfactory level it may be used as an analytical tool on other data.

The feature map generator module 130 generates the feature map 132 based on the sensor data 129, which in this embodiment, includes image data 212 and range point data 214 provided from one or more ranging systems (e.g., lidar and/or radar systems). The image data 212 includes pixel information obtained via cameras. The feature map 132 is a machine-readable representation of the driving environment. The feature map 132 includes features of the driving environment acquired via the sensor system 128 at any given instant.

In this embodiment, the feature map generator module 130 is a feature extraction convolutional neural network (CNN) 130 that derives the feature map 132 from the camera-based RGB images captured by cameras and range images captured by radars and/or lidars. As is known in the art, a convolutional neural network (CNN) is a class of deep, feed-forward artificial neural networks. They are also known as shift invariant or space invariant artificial neural networks (SIANN), based on their shared-weights architecture and translation invariance characteristics. A CNN architecture is formed by a stack of distinct layers that transform the input volume into an output volume through a differentiable function. A few distinct types of layers are commonly used called convolution layers and max-pooling layers.

A convolutional layer's parameters consist of a set of learnable filters (or kernels), which have a small receptive field, but extend through the full depth of the input volume. During the forward pass, each filter is convolved across the width and height of the input volume, computing the dot product between the entries of the filter and the input and producing a 2-dimensional activation map of that filter. As a result, the network learns filters that activate when it detects some specific type of feature at some spatial position in the input. Stacking the activation maps for all filters along the depth dimension forms the full output volume of the convolution layer. Every entry in the output volume can thus also be interpreted as an output of a neuron that looks at a small region in the input and shares parameters with neurons in the same activation map.

When dealing with high-dimensional inputs such as images, it is impractical to connect neurons to all neurons in the previous volume because such a network architecture does not take the spatial structure of the data into account. Convolutional networks exploit spatially local correlation by enforcing a local connectivity pattern between neurons of adjacent layers: each neuron is connected to only a small region of the input volume. The extent of this connectivity is a hyperparameter called the receptive field of the neuron. The connections are local in space (along width and height), but always extend along the entire depth of the input volume. Such an architecture ensures that the learnt filters produce the strongest response to a spatially local input pattern.

Three hyperparameters control the size of the output volume of the convolutional layer: the depth, stride and zero-padding. The depth of the output volume controls the number of neurons in a layer that connect to the same region of the input volume. These neurons learn to activate for different features in the input. For example, if the first convolutional layer takes the raw image as input, then different neurons along the depth dimension may activate in the presence of various oriented edges, or blobs of color. Stride controls how depth columns around the spatial dimensions (width and height) are allocated. When the stride is 1 then we move the filters one pixel at a time. This leads to heavily overlapping receptive fields between the columns, and also to large output volumes. When the stride is 2 (or rarely 3 or more) then the filters jump 2 pixels at a time as they slide around. The receptive fields overlap less and the resulting output volume has smaller spatial dimensions. Sometimes it is convenient to pad the input with zeros on the border of the input volume. The size of this padding is a third hyperparameter. Padding provides control of the output volume spatial size. In particular, sometimes it is desirable to exactly preserve the spatial size of the input volume.

The spatial size of the output volume can be computed as a function of the input volume size W, the kernel field size of the Cony Layer neurons K, the stride with which they are applied S, and the amount of zero padding P used on the border. The formula for calculating how many neurons "fit" in a given volume is given by $(W-K+2P)/S+1$. If this number is not an integer, then the strides are set incorrectly and the neurons cannot be tiled to fit across the input volume in a symmetric way. In general, setting zero padding to be $P=(K-1)/2$ when the stride is $S=1$ ensures that the input volume and output volume will have the same size spatially. Though it's generally not completely necessary to use up all of the neurons of the previous layer, for example, just a portion of padding may be used. A parameter sharing scheme is used in convolutional layers to control the number of free parameters. It relies on one reasonable assumption: That if a patch feature is useful to compute at some spatial position, then it should also be useful to compute at other positions. In other words, denoting a single 2-dimensional slice of depth as a depth slice, the neurons are constrained in each depth slice to use the same weights and bias. Since all neurons in a single depth slice share the same parameters, then the forward pass in each depth slice of the CONV layer can be computed as a convolution of the neuron's weights with the input volume (hence the name: convolutional layer). Therefore, it is common to refer to the sets of weights as a filter (or a kernel), which is convolved with the input.

The result of this convolution is an activation map, and the set of activation maps for each different filter are stacked together along the depth dimension to produce the output volume. Parameter sharing contributes to the translation invariance of the CNN architecture. Sometimes the parameter sharing assumption may not make sense. This is especially the case when the input images to a CNN have some specific centered structure, in which completely different features are to be learned on different spatial locations.

Another important concept of CNNs is pooling, which is a form of non-linear down-sampling. There are several non-linear functions to implement pooling including max pooling. Max pooling layers can be inserted between successive convolutional layers of the CNN architecture. In max pooling the input image is partitioned into a set of non-overlapping rectangles and, for each such sub-region, outputs the maximum. The pooling layer serves to progressively reduce the spatial size of the representation, to reduce the number of parameters and amount of computation in the network, and hence to also control overfitting. The pooling operation provides another form of translation invariance. Each max pooling layer operates independently on every depth slice of the input and resizes it spatially. The most common form is a pooling layer with filters of size 2×2 applied with a stride of 2 downsamples at every depth slice in the input by 2 along both width and height, discarding 75% of the activations. In this case, every max operation is over 4 numbers. The depth dimension remains unchanged.

Max-pooling is often structured via Fukushima's convolutional architecture. Fukushima, K. (1980). "Neocognitron: A self-organizing neural network model for a mechanism of pattern recognition unaffected by shift in position". Biol. Cybern. 36 (4): 193-202. This architecture allows CNNs to take advantage of the 2D structure of input data. As such, CNNs are suitable for processing visual and other two-dimensional data. They can be trained with standard back-propagation. CNNs are easier to train than other regular, deep, feed-forward neural networks and have many fewer parameters to estimate.

Referring again to FIG. 6, the feature extraction CNN 130 shown in FIG. 6 is exemplary and includes a number of stages or layers including a first convolutional layer 224, a first max-pooling layer 226, a second convolutional layer 228, and a second max-pooling layer 229. However, it should be appreciated depending on the implementation, the feature extraction CNN 130 could include any number of layers required to generate a feature layer 232 based on the image data 212 that is input.

The feature extraction CNN 130 receives the sensor data 129 as an input layer 222. The sensor data 129 can include image data 212 and range point data 214. The image data 212 can include an image that includes pixel information or data (e.g., pixels) obtained via cameras. The range point data 214 can include data that is obtained by ranging systems such as lidar and/or radar systems of the vehicle. The different layers 224, 226, 228, 229 of the feature extraction CNN 130 can process pixel information that makes up the image data from an image to extract various features from that image to produce a feature layer 232. To explain further, each layer 224, 226, 228, 229 of the feature extraction CNN 130 is configured to successively process pixels of the image data to further extract features from the image data 212 and output feature layers 232, 236.

In one embodiment, the input layer 222 can be a concatenation of the input images of red-blue-green channel subtracted by a mean image to generate overall input to the neural network. A first convolutional layer 224 is configured to apply a first bank of convolutional kernels to an input layer 222 comprising red-green-blue (RGB) image data. For example, the input to the first convolutional layer 224 can be convoluted with a bank of convolutional kernels to generate output neural activations through a non-linear activation function such as a rectified linear unit (ReLU) function. Each convolutional kernel generates a first layer output channel that comprises an image having a first resolution. A first max-pooling layer 226 is configured to process each first output channel by applying a maximum value operation to that first output channel to down-scale the corresponding image and generate a down-scaled map having the first resolution. The first max-pooling layer 226 outputs a plurality of second output channels that each comprise an image having a second resolution that is less than the first resolution. A second convolutional layer 228 configured to apply a second bank of convolutional kernels to each of the plurality of second output channels. Each convolutional kernel of the second bank generates a third output channel that comprises an image having a third resolution that is less than the second resolution. For example, the input to the second convolutional layer 228 can be convoluted with another bank of convolutional kernels to generate output neural activations through a non-linear activation function such as a ReLU function. A second max-pooling layer 229 configured to process each third output channel by applying another maximum value operation to that third output channel to down-scale the corresponding image and generate a down-scaled map having the third resolution. The second max-pooling layer 229 outputs a plurality of fourth output channels that each comprise an image having a fourth resolution that is less than the third resolution. The feature layer comprises a three-dimensional tensor comprising the plurality of fourth output channels.

The feature extraction CNN 130 processes the range point data 214 to generate a range presence map 238 of range point data. Each range point indicates a value of a distance from a vehicle. The feature extraction CNN 130 concatenates each feature layer 232 with a previous feature layer 236 and a range presence map 238 to generate and output the feature map 132. The feature map 132 is the concatenated layers from feature layer 232, the previous feature layer 236, and the range presence map 238. In other words, the concatenation of range presence map 238, the current vision-based feature map 232 and a previous vision-based feature map 236 from a previous time instant form the whole feature map 132.

The perception map generator module 134 generates the perception map 141 based on the feature map 132. The perception map is a human-readable representation of the driving environment that includes scenes being acquired via the sensor system 128 at any given instant. As will be described below, the perception map 141 includes multiple elements including: object (bounding boxes) locations, orientations, velocities (represented by 141-A); a freespace grid or image segmentation of freespace (represented by 141-B); road feature locations/types (represented by 141-C); and stixels (represented by 141-D).

In this embodiment, the perception map generator module 134 comprises an object detection-level CNN 130 that detects objects and performs processing to derive the perception map 141 from the feature map 132. In this embodiment, the object detection-level CNN that includes a region of interest (ROI) pooling module 242, a region proposal (RP) generator module 244, a fast-convolutional neural network (RCNN) 246, a freespace feature generator module 248, a road-level feature generator module 249, and a stixel generator module 252. Each of these components of the perception map generator module 134 can process the feature map 132 to generate various elements that make up the perception map 141. As will be explained in greater detail below, each of these components of the perception map generator module 134 can process the feature map 132 to generate various elements that make up the perception map 141. The region proposal (RP) generator module 244 processes the feature map 132 to generate a set of bounding box region proposals; the region of interest (ROI) pooling module 242 processes the feature map 132 and the set of bounding box region proposals to generate a set of bounding box candidates; the fast-convolutional neural network (RCNN) 246 processes the bounding box candidates to generate object (bounding boxes) locations, orientations, velocities (represented by 141-A); the freespace feature generator module 248 processes the feature map 132 to generate a freespace grid or image segmentation of freespace (represented by 141-B); the road-level feature generator module 249 processes the feature map 132 to generate road feature locations/types (represented by 141-C); and the stixel generator module 252 processes the feature map 132 to generate stixels (represented by 141-D).

The region proposal (RP) generator module 244 receives the feature map 132 as its input and processes it to generate outputs (e.g., a set of bounding box region proposals) that are provided to the ROI pooling module 242. The ROI pooling module 242 processes the set of bounding box region proposals from the RP generator module 244 along with the feature map 132 to generate a set of bounding box candidates that are provided to the fast-convolutional neural network (RCNN) 246. The fast-convolutional neural network (RCNN) 246 processes set of bounding box candidates to generate some of the elements that make up the perception map 120, namely the object (bounding box) locations, orientations, velocities (as represented by 141-A).

ROI pooling is an operation widely used in object detection tasks using convolutional neural networks. Region of interest pooling is a neural-net layer used for object detection tasks to achieve a significant speedup of both training and testing. It also maintains a high detection accuracy. See, for example, Girshick, Ross, et al. "Rich feature hierarchies for accurate object detection and semantic segmentation." *Proceedings of the IEEE conference on computer vision and pattern recognition*. 2014, and Girshick, Ross. "Fast r-cnn." *Proceedings of the IEEE International Conference on Computer Vision*. 2015.

The ROI pooling module 242 receives the feature map 132 and the set of bounding box region proposals that are output by the region proposal (RP) generator 244 as its inputs, and processes these inputs to extract regions of interest from the feature map 132 that are called bounding box candidates. These bounding box candidates are provided to the fast R-CNN 246. For example, in a scene with 2-3 vehicle, 100 candidates are generated by RP generator 244. ROI pooling module 242 extracts a sub-window from the whole-image feature map 132 based on the set of bounding box region proposals, and rescales to a 7×7 grid size. Then the 7×7 grid is fed into the fast-convolutional neural network (RCNN) 246 for final object detection, which outputs the box location, orientation, velocity. In one embodiment, the ROI pooling module 242 takes two inputs: a fixed-size feature map 132 obtained from a deep convolutional neural network 130 with several convolutions and max pooling layers, and an N×5 matrix of representing a list of regions of interest, where N is a number of ROIs. The first column represents the image index and the remaining four are the coordinates of the top left and bottom right corners of the region. For every region of interest from the input list, ROI pooling module 242 takes a section of the input feature map 132 that corresponds to it and scales it to some pre-defined size (e.g., 7×7). The scaling can be done by: dividing the region proposal into equal-sized sections (the number of which is the same as the dimension of the output); finding the largest value in each section; and copying these max values to the output buffer. The result is that from a list of rectangles with different sizes a list of corresponding feature maps with a fixed size can be quickly generated. The dimension of the ROI pooling output does not actually depend on the size of the input feature map nor on the size of the region proposals. It's determined solely by the number of sections that the region proposal is divided into.

The fast-convolutional neural network (R-CNN) 246 is a state-of-the-art visual object detection system that combines bottom-up region bounding box proposals with rich features computed by a convolutional neural network. The fast-convolutional neural network (R-CNN) 246 processes the image data from the feature map for the regions of interest to detect and localize objects, and classify the detected objects within the perception map 141. Objects that are detected can be classified according to semantic classes, for example, pedestrians, vehicles, etc.

In one embodiment, the fast-convolutional neural network (R-CNN) 246 is a multi-layer CNN design that monitors the extracted 7×7 grid feature map computed by ROI pooling module 242 for each region proposal (RP), and outputs the 3D bounding box attribute (i.e., center position, width, height, and length), the object velocity, and object classification probabilities (i.e., the likelihood that the bounding box enclosed a vehicle, pedestrian, motorcycle, and etc.). The box velocity can be estimated through regression using neural network by monitoring the input from feature layer 232 and the previous feature layer 236. In one implementation, the fast-convolutional neural network (R-CNN) 246 can be trained separately with labelled data.

The freespace feature generator module 248 is a multi-layer CNN without fully connected layers at later stage. The freespace feature generator module 248 monitors the whole feature map 132, and generates a Boolean image of the same size as the input RGB image data 212. The true pixels of the Boolean image correspond to the free drivable space. The network of the freespace feature generator module 248 is trained separately with labelled data.

The road-level feature generator module 249 is a multi-layer CNN design similar to freespace 248. The road-level feature generator module 249 monitors the whole feature map 132, and generates multiple Boolean images of the same size as the input image data 212. The pixels with true value in these Boolean images corresponds to the lane markings, and road edges, respectively. The road-level feature generator module 249 is also trained separately with the labelled data.

The stixel generator module 252 is multi-layer CNN design with convolutional layers only. The stixel generator module 252 monitors the whole feature map 132 as the input, and generates the output. The stixel generator module 252 can be trained separately with the labelled data. In one embodiment, the stixel generator module 252 partitions the whole image into shoulder-to-shoulder vertical slices of fixed width. The expected output of the network are the attributes for each slice such as the probability of the slice to be a stixel, lower end row index, and height. The stixels are vertical rectangular elements with a small fixed width that can be used to model obstacles of arbitrary shape whose classification type is not of interest in autonomous driving (e.g., guard rail in freeway, building, and bushes). Each stixel is defined by its 3D position relative to the camera and stands vertically on the ground, having a certain height. Each stixel separates the free space and approximates the obstacle's lower and upper boundaries.

The outputs generated by the fast R-CNN 246, the freespace feature generator module 248, the road-level feature generator module 249 and the stixel generator module 252 are used to generate the perception map 141. The perception map 141 includes bounding box sizes, bounding box locations, bounding box orientations, bounding box velocities of objects that are detected, object types (as represented by 141-A), free space features (freespace grid or image segmentation of freespace) as represented by 141-B, road feature locations and types (as represented by 141-C), and stixels (represented by 141-D) that approximate object boundaries that are detected.

As noted above with reference to FIG. 5, the vehicle control system 200 includes a primitive processor module 143 that includes a predicate logic (PL) and model predictive control (MPC) sensorimotor primitive processor module 143A and a learnt sensorimotor primitive processor module 143B that will now be described with reference to FIG. 7 and FIG. 8, respectively.

Figure 7:
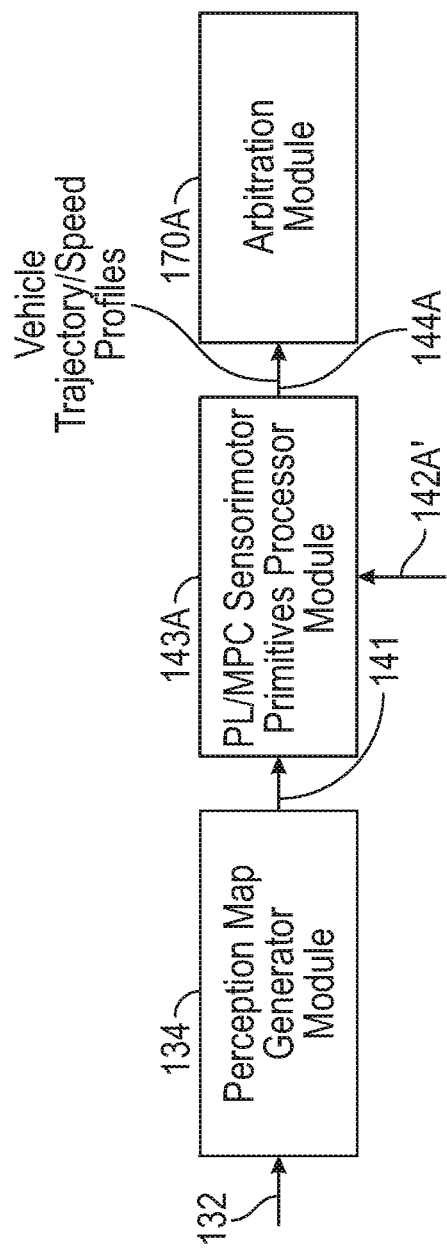
FIG. 7 is a block diagram that illustrates a perception map generator module, a predicate logic (PL) and model predictive control (MPC) sensorimotor primitive processor module, and an arbitration module of FIG. 5 in accordance with the disclosed embodiments.

FIG. 7 is a block diagram that illustrates a perception map generator module 134, a predicate logic (PL) and model predictive control (MPC) sensorimotor primitive processor module 143A, and an arbitration module 170A in accordance with the disclosed embodiments. FIG. 7 will be described with continued reference to FIGS. 4 and 5. FIG. 7 illustrates how the PL/MPC sensorimotor primitive processor module 143A processes the perception map 141 and the particular combination 142A' of the PL/MPC sensorimotor primitive modules 142A that have been selected and enabled by the scene understanding module 150 and the selector module 160 to generate a corresponding vehicle trajectory and speed profile 144A for each of the PL/MPC sensorimotor primitive modules 142A' that have been selected and enabled. In FIG. 7, the vehicle trajectory and speed profiles for each of the PL/MPC sensorimotor primitive modules 142A' are collectively shown as a single output via 144A, but it should be appreciated that 144A represents each of the vehicle trajectory and speed profiles for each of the PL/MPC sensorimotor primitive modules 142A'. The vehicle trajectory and speed profiles 144A are provided to the arbitration module 170A.

As described above, the perception map generator module 134 processes the feature map 132 to detect objects from the feature map 132, classifies the detected objects according to semantic classes (e.g., pedestrians, vehicles, etc.), and generates the perception map 141. The PL/MPC sensorimotor primitive processor module 143 can process information from the perception map 141. The information from the perception map 141 that is processed can include, for example, bounding box locations, orientations and velocities of detected objects from the perception map 141, road features and freespace features for the environment as indicated by the perception map 141, etc. Based on the object information and lane/road geometrical information from the perception map 141, the PL/MPC sensorimotor primitive processor module 143 can execute each of the PL/MPC sensorimotor primitive modules 142A' that has been selected and enabled to generate a corresponding vehicle trajectory and speed profile that includes information that specifies longitudinal distance (x), lateral distance (y), heading (θ), and desired velocity (v) of the vehicle that will travel through in future time instants, as described below with reference to FIG. 9B. The vehicle trajectory and speed profiles 144A can then be provided to the arbitration module 170A and processed as indicated above. For example, the arbitration module 170A applies priority logic rules to define a priority order for execution for each of the vehicle trajectory and speed profiles 144A, 144B.

Figure 8:
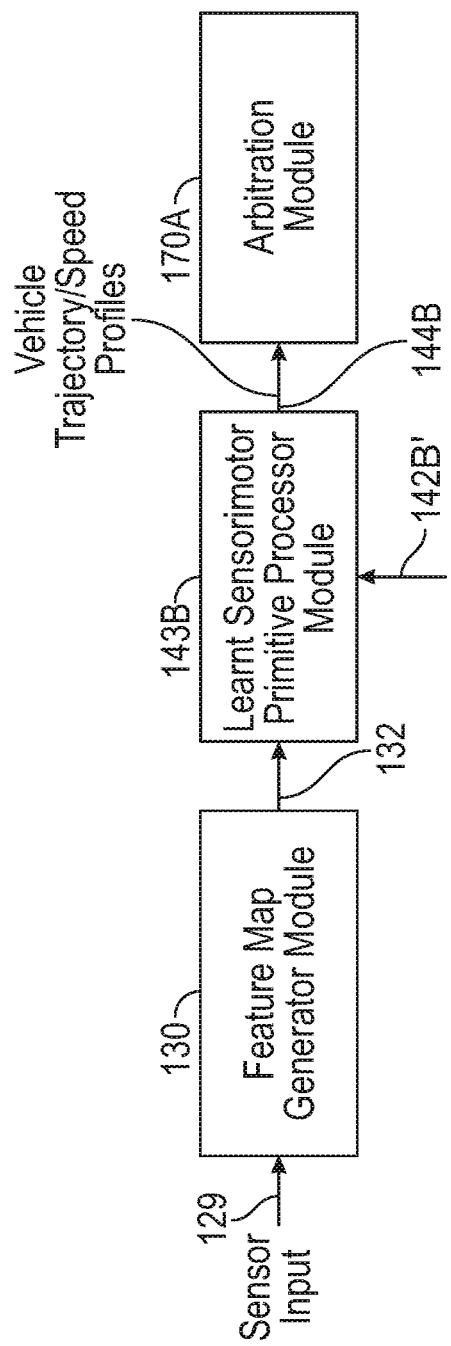
FIG. 8 is a block diagram that illustrates a feature map generator module, a learnt sensorimotor primitive processor module, and an arbitration module of FIG. 5 in accordance with the disclosed embodiments.

FIG. 8 is a block diagram that illustrates a feature map generator module 130, a learnt sensorimotor primitive processor module 143B, and an arbitration module 170A in accordance with the disclosed embodiments. FIG. 8 will be described with continued reference to FIGS. 4 and 5. FIG. 8 illustrates how the learnt sensorimotor primitive processor module 143B processes information from the feature map 132 and the particular combination 142B' of the learnt sensorimotor primitive modules 142B (that have been selected by the scene understanding module 150 and enabled by the selector module 160) to generate a corresponding vehicle trajectory and speed profile 144B for each of the learnt sensorimotor primitive modules 142B' that have been selected and enabled. The vehicle trajectory and speed profiles 144B are provided to the arbitration module 170A.

As described above, the feature map generator module 130 process the sensor data 129 to generate the feature map 132. The learnt sensorimotor primitive processor module 143 processes information from the feature map 132 to directly generate the vehicle trajectory and speed profiles 144A without explicit object, freespace, road-level feature, and stixel detection. In one the embodiment, the learnt sensorimotor primitive processor is implemented as a recurrent CNN network design. The input layer of the learnt primitive processor connects to the feature map 132 and there a long short-term memory layer that output the desired vehicle trajectory and speed profiles. Each learnt sensorimotor primitive processor is trained offline using the labelled data (e.g., capture human driving data). The information from the feature map 132 can include the concatenation of the feature layers 232, previous-cycle feature layers 234, and the range presence map 238. Based on the processed information from the feature map 132, the learnt sensorimotor primitive processor module 143 can execute each of the learnt sensorimotor primitive modules 142B' that has been selected and enabled to generate a corresponding vehicle trajectory and speed profile. In FIG. 8, the vehicle trajectory and speed profiles for each of the learnt sensorimotor primitive modules 142B' are collectively shown as a single output via 144B, but it should be appreciated that 144B represents each of the vehicle trajectory and speed profiles for each of the learnt sensorimotor primitive modules 142B'. The vehicle trajectory and speed profiles 144B can then be provided to the arbitration module 170A and processed as indicated above. For example, the arbitration module 170A applies priority logic rules to define a priority order for execution for each of the vehicle trajectory and speed profiles 144B also taking into account the vehicle trajectory and speed profiles 144A that were generated by the PL/MPC sensorimotor primitive processor module 143A of FIG. 7. The arbitration module 170A can then select one of the vehicle trajectory and speed profiles 171 having the highest priority ranking for execution by the vehicle control module 170B of FIG. 5 to generate control signals 172 that are sent to the actuator system 190 and processed by a low-level controller 192 to generate commands that are sent to actuators 194.

FIG. 9A is a block diagram that illustrates an arbitration module 170A, a vehicle control module 170B and an actuator system 190 in accordance with the disclosed embodiments. FIG. 9A will be described with continued reference to FIGS. 4, 5, 7 and 8. FIG. 9A illustrates how the arbitration module 170A can process the vehicle trajectory and speed profiles 144A, 144B, and then select one of the vehicle trajectory and speed profiles 171 having the highest priority ranking for execution by the vehicle control module 170B to generate control signals 172 that are sent to the actuator system 190.

As noted above with reference to FIG. 5, the scene understanding module 150 selects and enables, and the selector module 160 retrieves, a particular combination 142A' of the PL/MPC sensorimotor primitive modules 142A and/or a particular combination 142B' of the learnt sensorimotor primitive modules 142B that are provided to the PL/MPC sensorimotor primitive processor module 143A and the learnt sensorimotor primitive processor module 143B, respectively. The PL/MPC sensorimotor primitive processor module 143A processes the particular combination 142A' of the PL/MPC sensorimotor primitive modules 142A to generate a corresponding vehicle trajectory and speed profile 144A for each of the PL/MPC sensorimotor primitive modules 142A, and the learnt sensorimotor primitive processor module 143B processes the particular combination 142B' of the learnt sensorimotor primitive modules 142B to generate a corresponding vehicle trajectory and speed profile 144B for each of the learnt sensorimotor primitive modules 142B.

The arbitration module 170A applies priority logic rules to define a priority order for execution for each of the vehicle trajectory and speed profiles 144A, 144B, and selects one of the vehicle trajectory and speed profiles 171 having the highest priority ranking for execution. The vehicle control module 170B process the selected one of vehicle trajectory and speed profiles 171 by applying neuromorphic or ODE control models to the selected one of vehicle trajectory and speed profiles 171 to generate the control signals 172 that are used to generate commands (e.g., acceleration commands and steering torque or angle commands).

The neuromorphic control model applied by the vehicle control module 170B can vary depending on the implementation. In this embodiment, the neuromorphic control model applied by the vehicle control module 170B includes an inverse dynamic mapping module 170B1 and a forward dynamic mapping module 170B2.

The inverse dynamic mapping module 170B1 generates the control signals 172 based on the selected one of the vehicle trajectory and speed profiles 171 from the arbitration module 170A and a predicted vehicle trajectory and speed profile 173 that is generated by the forward dynamic mapping module 170B2. For example, in one embodiment, the inverse dynamic mapping module 170B1 is a recurrent neural network that monitors the desired trajectory and speed profile 171 and the predicted trajectory and speed profile 173 as inputs, and determines the correcting control signals 172 that minimize the difference between the desired trajectory and speed profile 171 and predicted trajectory and speed profile 173. The inverse dynamic mapping module 170B1 provides the control signals 172 to the actuator system 130. The actuator system 130 processes the control signals 172 to generate the appropriate commands to control actuators of various vehicle systems and subsystems.

The forward dynamic mapping module 170B2 is a recurrent neural network that generates a predicted vehicle trajectory and speed profile 173 (e.g., that represents a predicted path of the vehicle) based on the current control signals 172. Stated in a different way, the forward dynamic mapping module 170B2 is a recurrent neural network that is responsible for determining how actions taken via the control signals 172 affect the perceived reality by relating vehicle kinematics/dynamics with the attended fixation points (i.e., desired trajectory and speed profile 171). The neural network used to implement the forward dynamic mapping module 170B2 can be trained based on captured human driving data.

For example, in the lane following sensorimotor primitive module, the desired trajectory is the center of the lane. The forward dynamic mapping module 170B2 predicts the response of the vehicle relevant to the desired lane center as the reference, given the current corrective steering command. As another example given a percentage of brake pedal and steering wheel angle, the forward dynamic mapping module 170B2 can predict the vehicle trajectory within the horizon.

In this embodiment, the forward dynamic mapping module 170B2 can process the control signals 172 feedback from the inverse dynamic mapping module 170B1 and generate the predicted vehicle trajectory and speed profile 173 based on the control signals 172. For instance, in the lane following primitive example, if the corrective command is valid it will bring the vehicle more to the center of the lane.

Figure 9B:
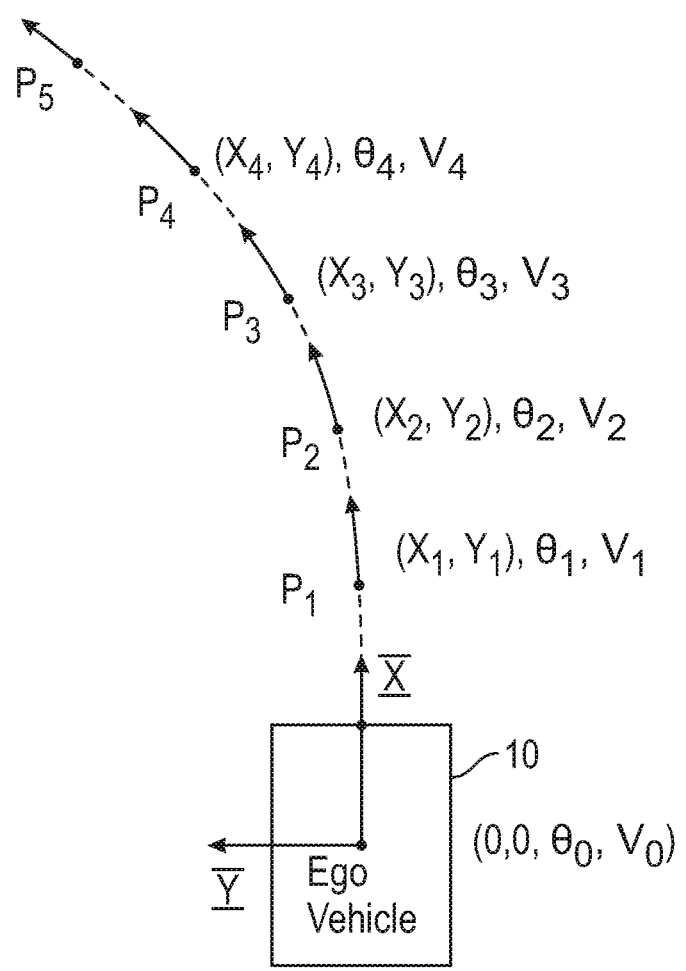
FIG. 9B is a diagram that illustrates one non-limiting example of a vehicle trajectory and speed profile in accordance with the disclosed embodiments.

As mentioned above, each sensorimotor primitive module 142 is capable of generating a vehicle trajectory and speed profile that is represented as a sequence of states visited by the vehicle parameterized by time and velocity including information that specifies longitudinal distance (x), lateral distance (y), heading (θ), and desired velocity (v) of the vehicle that will travel through in future time instants. These parameters are referred to the coordinate system of the ego vehicle. FIG. 9B is a diagram that illustrates one non-limiting example of a vehicle trajectory and speed profile in accordance with the disclosed embodiments. In this simplified example, a particular sensorimotor primitive module 142 has been selected and enabled to generate a corresponding vehicle trajectory and speed profile that is defined by a series of waypoints ($P_1 \ldots P_5$) for purposes of illustration, but it should be appreciated that a vehicle trajectory and speed profile could include any number of waypoints in a practical implementation. Each waypoint ($P_n$) is represented in the coordinate frame of the ego vehicle. For example, $P_0$ is the current position of the ego vehicle, and is at the origin (0,0) of the coordinate frame. Each waypoint ($P_n$) is defined by information that specifies longitudinal and lateral distance (X, Y), heading (θ) with respect to the X-axis, and desired velocity (v) of the vehicle 10 that will travel through in future time instants. All the quantities (X, Y, θ, V) are in the perspective of ego vehicle. Because the ego vehicle is moving, so does the vehicle trajectory and speed profile. The set of waypoints represents a geometric path that the vehicle should follow from an initial configuration to a given terminating configuration to achieve a desired objective (e.g., safely reach a location while complying with rules of traffic and without colliding with obstacles and meeting passenger comfort constraints). This representation presumes that motion the vehicle can only move backwards and forwards, tangentially to the direction of their main body and that the steering radius is bounded. Although not illustrated in FIG. 9B, in other embodiments, the vehicle trajectory and speed profile could be specified using a more complex set of attribute values describing the state or condition of an autonomous vehicle at an instance in time and at a particular place during its motion.

FIGS. 10-13 are flowcharts that illustrate methods performed in accordance with the disclosed embodiments. FIGS. 10-13 will be described with continued reference to FIGS. 1-9B. With respect to FIGS. 10-13, the steps of each method shown are not necessarily limiting. Steps can be added, omitted, and/or performed simultaneously without departing from the scope of the appended claims. Each method may include any number of additional or alternative tasks, and the tasks shown need not be performed in the illustrated order. Each method may be incorporated into a more comprehensive procedure or process having additional functionality not described in detail herein. Moreover, one or more of the tasks shown could potentially be omitted from an embodiment of each method as long as the intended overall functionality remains intact. The order of operation within a method is not limited to the sequential execution as illustrated in FIGS. 10-13, but may be performed in one or more varying orders as applicable and in accordance with the present disclosure. In various embodiments, the methods can be scheduled to run based on one or more predetermined events, and/or can run continuously during operation of the autonomous vehicle 10. Further, each method is computer-implemented in that various tasks or steps that are performed in connection with each method may be performed by software, hardware, firmware, or any combination thereof. For illustrative purposes, the following description of each method may refer to elements mentioned above in connection with FIGS. 1-9B. In certain embodiments, some or all steps of these methods, and/or substantially equivalent steps, are performed by execution of processor-readable instructions stored or included on a processor-readable medium. For instance, in the description of FIGS. 10-13 that follows, various modules can be described as performing various acts, tasks or steps, but it should be appreciated that this refers to processing system(s) of these modules executing instructions to perform those various acts, tasks or steps. Depending on the implementation, some of the processing system(s) can be centrally located, or distributed among a number of processors or controllers that work together.

Figure 10A:
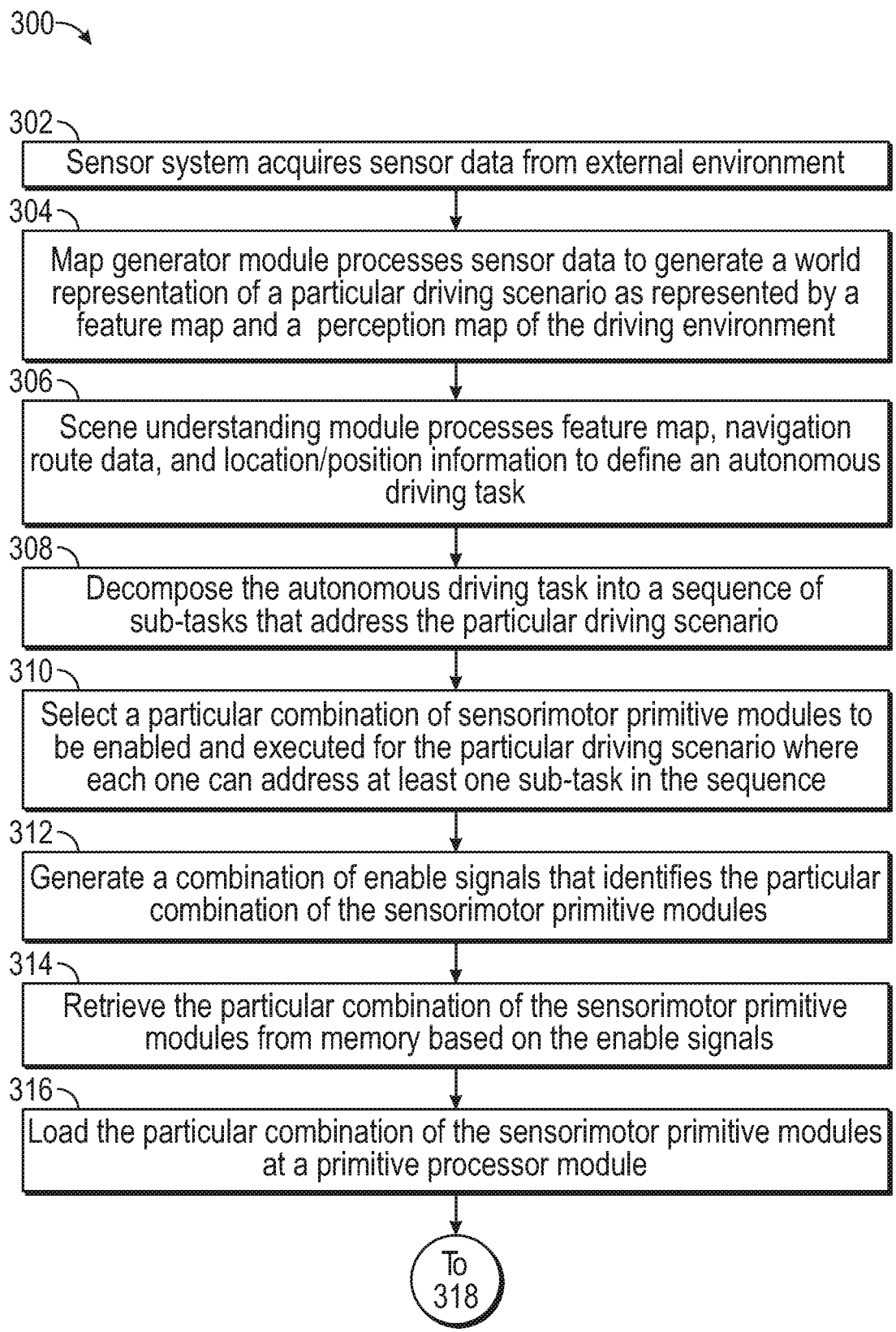
FIG. 10A is a flowchart illustrating a control method for controlling an autonomous vehicle in accordance with the disclosed embodiments.
Figure 10B:
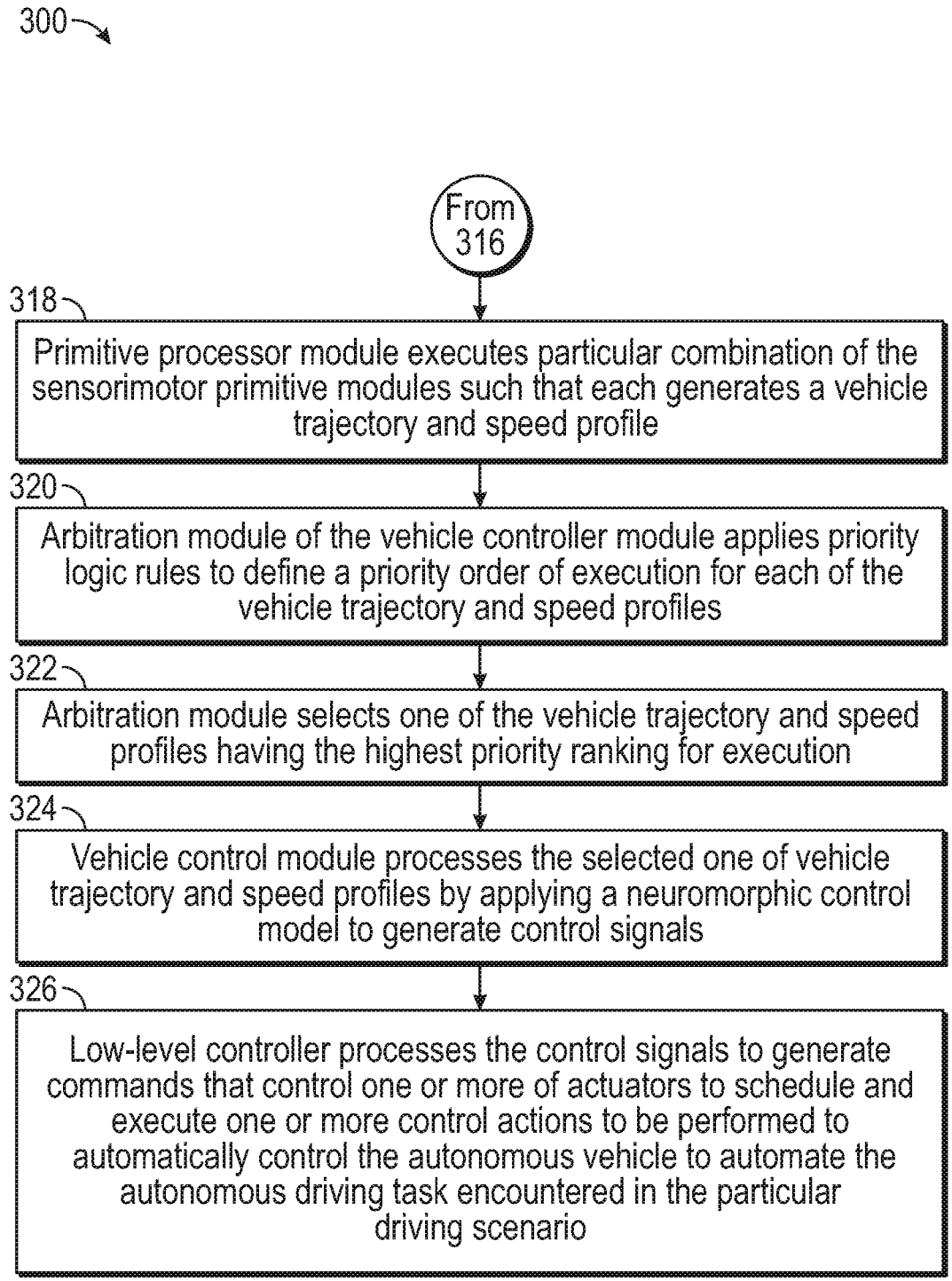
FIG. 10B is a flowchart illustrating a method for controlling an autonomous vehicle in accordance with the disclosed embodiments.

Referring now to FIG. 10, a flowchart illustrates a control method 300 for controlling an autonomous vehicle that can be performed by the vehicle control system 200 of FIG. 5 in accordance with the disclosed embodiments. The method 300 will be described with continued reference to FIGS. 3-9.

At 302, the sensor system 128 of the autonomous vehicle acquires sensor data from the external environment.

At 304, the map generator module 130, 134 of the high-level controller 133 processes the sensor data 129 to generate a world representation 138 of a particular driving scenario as represented by the sensor data 129, navigation route data and position information at a particular instant of time. As will be described in greater detail below, the world representation 138 can include a feature map 132 and a perception map 141. The feature map 132 is a machine-readable representation of the driving environment that includes features of the driving environment acquired via the sensor system 128 at any given instant. The perception map 141 is a human-readable representation of the driving environment that includes scenes being acquired via the sensor system 128 at any given instant.

At 306, the scene understanding module 150 of the high-level controller, processes a feature map of the world representation, navigation route data that indicates a route of the autonomous vehicle, and location/position information that indicates the location of the autonomous vehicle to define an autonomous driving task.

At 308, the scene understanding module 150 can then decompose the autonomous driving task into a sequence of sub-tasks that address the particular driving scenario.

At 310, the scene understanding module 150 can select a particular combination 142A', 142B' of sensorimotor primitive modules to be enabled and executed for the particular driving scenario from a plurality of sensorimotor primitive modules 142A, 142B that are stored in memory. The particular combination 142A', 142B' of sensorimotor primitive modules can be a subset that includes one or more of the ensemble of sensorimotor primitive modules 142A, 142B. Each one of the particular combination 142A', 142B' of the sensorimotor primitive modules that is enabled can address at least one sub-task in the sequence. In some cases, a given sub-task may be addressed by more than one of the particular combination 142A', 142B' of the sensorimotor primitive modules that is enabled, in which case it is necessary to choose one over the other based on their relative priority.

As noted above, each sensorimotor primitive module is executable (when selected and enabled) to generate a vehicle trajectory and speed profile for automatically controlling the autonomous vehicle to cause the autonomous vehicle to perform a specific driving maneuver. Each sensorimotor primitive module maps information from the world representation to a vehicle trajectory and speed profile. Each vehicle trajectory and speed profile maps to one or more control signals that cause one or more control actions that automatically control the autonomous vehicle to cause the autonomous vehicle to perform a specific driving maneuver that addresses the particular driving scenario encountered during the autonomous driving task and operation of the autonomous vehicle. Each sensorimotor primitive module is location agnostic meaning that it is capable of operating in different environments. As also described above, each sensorimotor primitive module can be either a predicate logic (PL) sensorimotor primitive module, a model predictive control (MPC) sensorimotor primitive module or a learnt sensorimotor primitive module.

At 312, the scene understanding module 150 can generate a combination of enable signals 152 that identifies the particular combination 142A', 142B' of the sensorimotor primitive modules.

At 314, the selector module 160 can retrieve, the particular combination 142A', 142B' of the sensorimotor primitive modules from memory 140 based on the enable signals 152.

At 316, the selector module 160 can load the particular combination 142A', 142B' of the sensorimotor primitive modules at a primitive processor module 142.

At 318, the primitive processor module 142 execute the particular combination 142A', 142B' of the sensorimotor primitive modules such that each generates a vehicle trajectory and speed profile. In one embodiment, the primitive processor module 142 includes a predicate logic (PL) and model predictive control (MPC) sensorimotor primitive processor module 143A and a learnt sensorimotor primitive processor module 143A. The predicate logic (PL) and model predictive control (MPC) sensorimotor primitive processor module 142 processes information from the perception map 141, and executes PL/MPC sensorimotor primitive modules of the particular combination 142A', 142B' of the sensorimotor primitive modules based on the processed information from the perception map 141 such that each generates a vehicle trajectory and speed profile 144. The learnt sensorimotor primitive processor module 142 processes information from the feature map 132, and executes learnt sensorimotor primitive modules of the particular combination 142A', 142B' of the sensorimotor primitive modules based on the processed information from the feature map 132 such that each generates a vehicle trajectory and speed profile 144.

At 320, the arbitration module 170A of the vehicle controller module 148 can apply priority logic rules to define a priority order for execution for each of the vehicle trajectory and speed profiles 144 that were generated at 318.

At 322, the arbitration module 170A can select one of the vehicle trajectory and speed profiles 171 having the highest priority ranking for execution.

At 324, the vehicle control module 170B of the vehicle controller module 148 can process the selected one of vehicle trajectory and speed profiles 171 by applying a neuromorphic control model to the selected one of vehicle trajectory and speed profiles 171 to generate the control signals 172.

At 326, the low-level controller 192 of the actuator system 190 can process the control signals 172 from the vehicle control module 170B to generate commands. The commands control one or more of actuators 194 (e.g., one or more of a steering torque or angle controller, a brake system, and a throttle system) of the autonomous vehicle in accordance with the control signals 172 to schedule and execute one or more control actions to be performed to automatically control the autonomous vehicle to automate the autonomous driving task encountered in the particular driving scenario. This allows the autonomous vehicle to achieve the selected one of vehicle trajectory and speed profiles 171.

Figure 11:
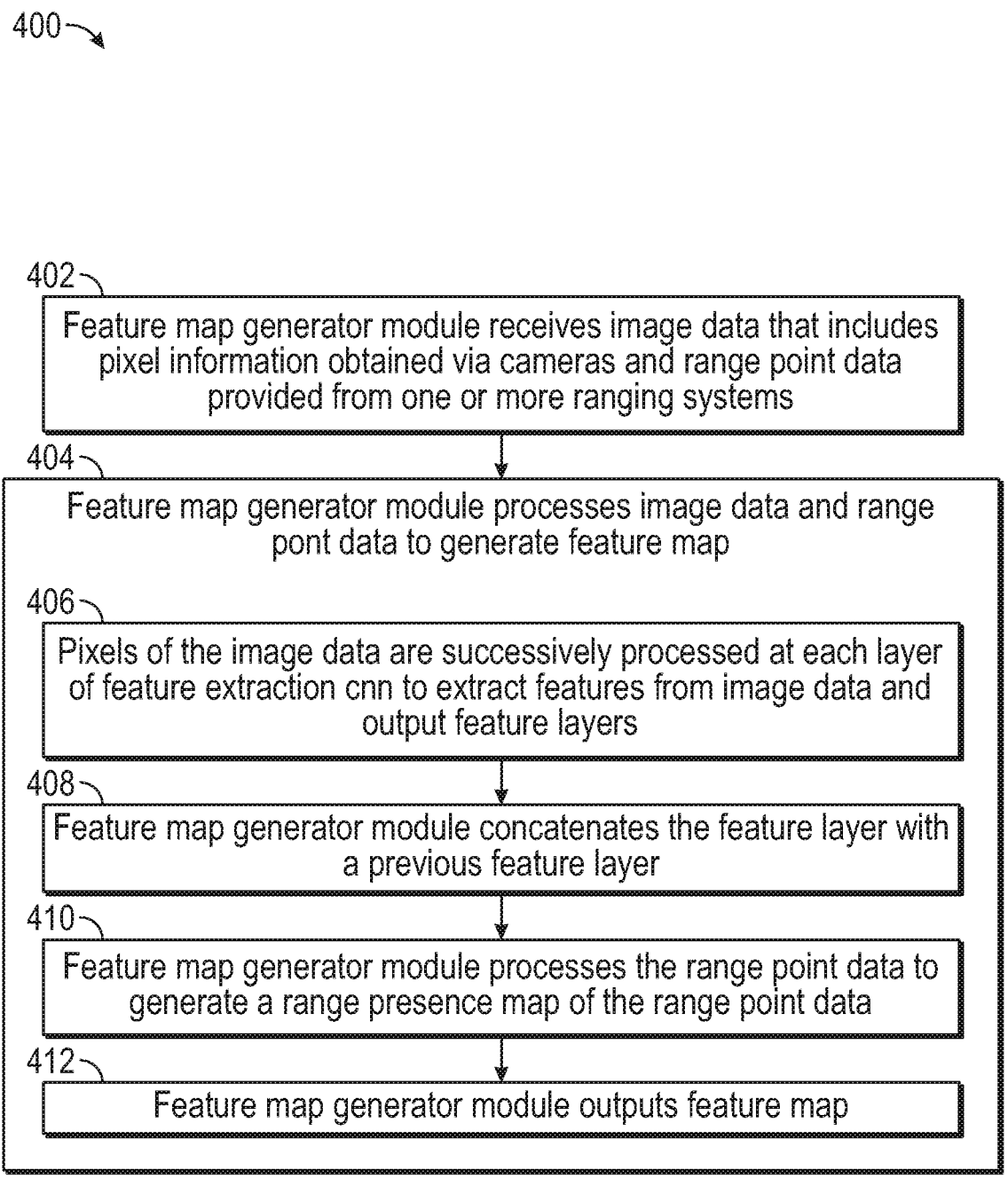
FIG. 11 is a flowchart illustrating a method for generating a feature map in accordance with the disclosed embodiments.

FIG. 11 is a flowchart illustrating a method 400 for generating a feature map 132 in accordance with the disclosed embodiments. The method 400 will be described with continued reference to FIGS. 3-7. As described above, with reference to FIG. 6, the feature map generator module 130 includes a feature extraction convolutional neural network (CNN) 130 comprising a plurality of layers.

At 402, the feature map generator module 130 receives the sensor data 129. The sensor data 129 include image data 212 that includes pixel information obtained via cameras and range point data 214 provided from one or more ranging systems. At 404, the feature map generator module 130 processes the sensor data 129 and range point data 214 to generate the feature map 132.

At 406, pixels of the image data are successively processed at each layer of the feature extraction CNN 130 to extract features from the image data and output feature layers. In one embodiment, the layers of the feature extraction CNN 130 include an input layer 222, a first convolutional layer 224, a first max-pooling layer 226, a second convolutional layer 228 and a second max-pooling layer 229. Each layer 222-229 processes pixel data from the preceding layer to extract features ultimately resulting in a feature layer that is a three-dimensional tensor.

At 408, the feature map generator module 130 concatenates the feature layer with a previous feature layer. At 410, the feature map generator module 130 processes the range point data to generate a range presence map 238 of the range point data. Each range point indicates a value of a distance from the autonomous vehicle. At 412, the feature map generator module 130 outputs the feature map 132, which is the concatenated layers from feature layer 232, previous feature layer 236, and range presence map 238. In other words, the concatenation of range presence map 238, the current vision-based feature map 232 and a previous vision-based feature map 236 from a previous time instant form the whole feature map 132

Figure 12:
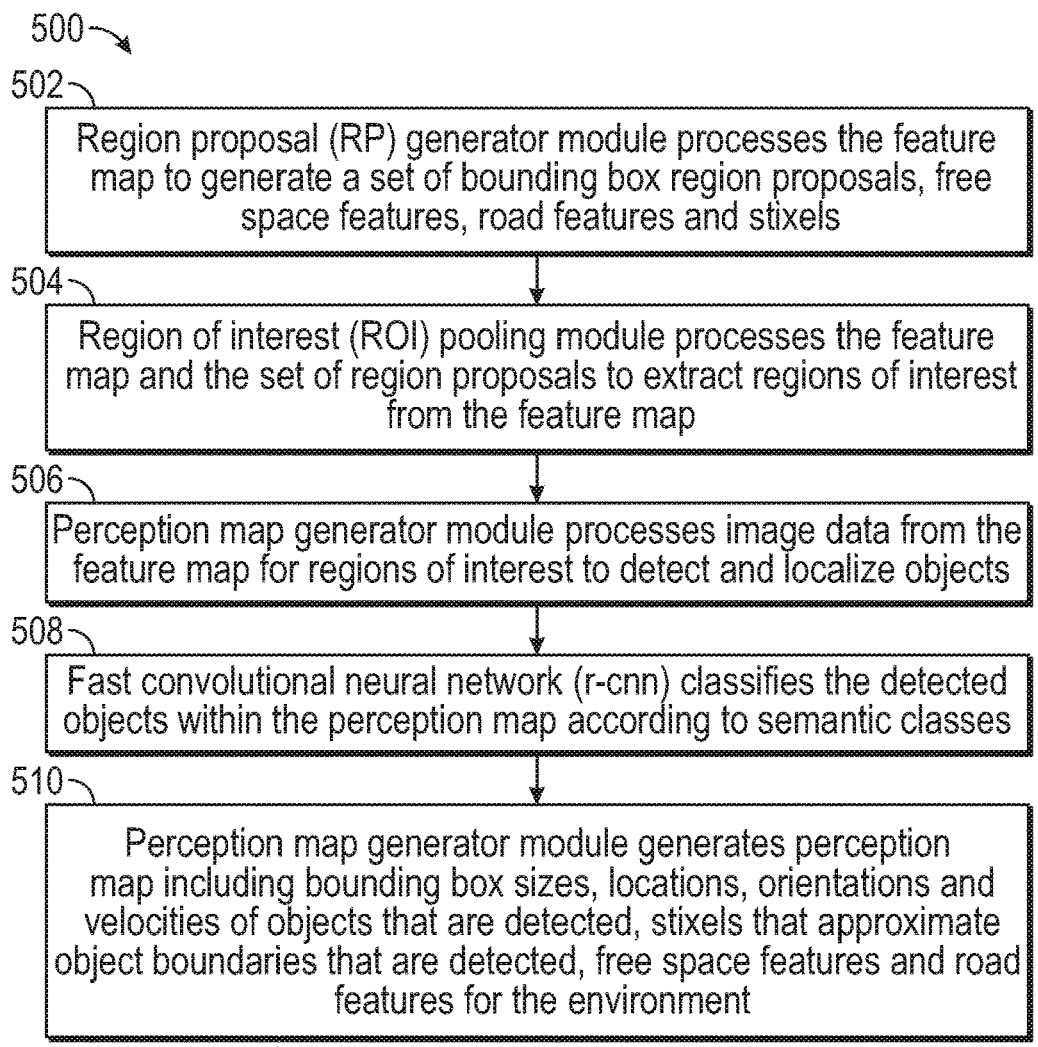
FIG. 12 is a flowchart illustrating a method for generating a perception map in accordance with the disclosed embodiments.

FIG. 12 is a flowchart illustrating a method 500 for generating a perception map 141 in accordance with the disclosed embodiments. The method 500 will be described with continued reference to FIGS. 3-8. In one embodiment, as described above with reference to FIG. 6, the perception map generator module 134 includes an object detection CNN that includes a region proposal (RP) generator module 244, a region of interest (ROI) pooling module 242, a fast convolutional neural network (RCNN) 246, a freespace feature generator module 248, a road-level feature generator module 249, and a stixel generator module 252.

At 502, the region proposal (RP) generator module 244 processes the feature map to generate a set of bounding box region proposals, free space features, road features and stixels. At 504, the region proposal (RP) generator module 244 processes the feature map 132 to generate a set of bounding box region proposals, the region of interest (ROI) pooling module 242 processes the feature map and the set of bounding box region proposals to extract regions of interest from the feature map 132 and generate a set of bounding box candidates, the freespace feature generator module 248 processes the feature map 132 to generate a freespace grid or image segmentation of freespace (represented by 141-B), the road-level feature generator module 249 processes the feature map 132 to generate road feature locations/types (represented by 141-C), and the stixel generator module 252 processes the feature map 132 to generate stixels (represented by 141-D).

At 506, the perception map generator module 134 processes the feature map 132 to detect objects. For example, in one embodiment, the fast-convolutional neural network (RCNN) 246 processes the bounding box candidates to generate object (bounding boxes) locations, orientations, velocities (represented by 141-A). At 508, the fast-convolutional neural network (RCNN) 246 classifies the detected objects according to semantic classes.

At 510, the perception map generator module 134 generates the perception map 141 based on the detected objects. The perception map can include, for example, object (bounding boxes) locations, orientations, velocities (represented by 141-A); a freespace grid or image segmentation of freespace (represented by 141-B); road feature locations/types (represented by 141-C); and stixels (represented by 141-D).

Figure 13:
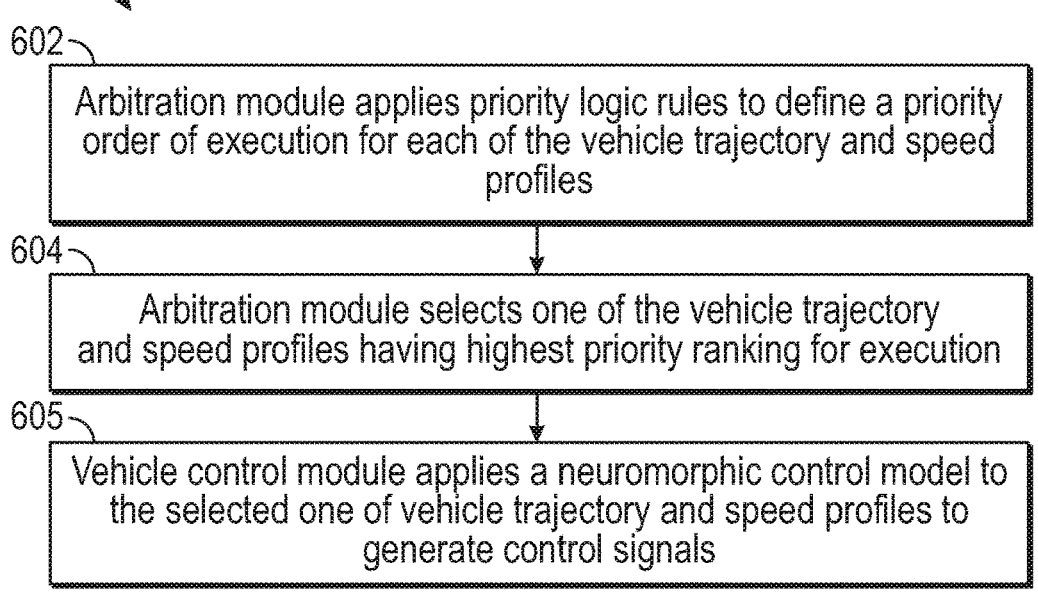
FIG. 13 is a flowchart illustrating a method for generating control signals for controlling the autonomous vehicle based on a selected vehicle trajectory and speed profile in accordance with the disclosed embodiments.

FIG. 13 is a flowchart illustrating a method 600 for generating control signals 172 for controlling the autonomous vehicle based on a selected vehicle trajectory and speed profile 171 in accordance with the disclosed embodiments. The method 600 will be described with continued reference to FIGS. 3-9. In one embodiment, as described above with reference to FIG. 9A, the vehicle control module 170B includes an inverse dynamic mapping module 170B1 and a forward dynamic mapping module 170B2.

At 602, at the arbitration module 170A applies priority logic rules to define a priority order for execution for each of the vehicle trajectory and speed profiles 144. The priority logic rules define a relative priority for each vehicle trajectory and speed profile 144.

At 604, at the arbitration module 170A selects one of the vehicle trajectory and speed profiles 171 having the highest priority ranking for execution.

At 606, the vehicle control module 170B applies a neuromorphic control model to the selected one of vehicle trajectory and speed profiles 171 to generate the control signals 172. For example, in one embodiment, the inverse dynamic mapping module 170B1 generates the control signals 172 based on the selected one of the vehicle trajectory and speed profiles 171 from the arbitration module 170A and a predicted vehicle trajectory and speed profile 173 that is generated by the forward dynamic mapping module 170B2 based on the control signals 172 (that are fedback from the inverse dynamic mapping module 170B1).

The disclosed embodiments can provide an autonomous driving system that includes a scene understanding module that can decompose an automated driving task into a set of sub-tasks, and then select an appropriate subset of scenario-specific skill modules (referred to as sensorimotor primitive modules) from an ensemble of scenario-specific skill modules to address each sub-task. Existing features and functions that are available within the vehicle (e.g., ACC/CMB, Navigation Maps and GPS) can be re-used and sensorimotor primitive modules can be added or adapted as needed to address particular driving scenarios. Among other things, this approach reduces validation complexity. The disclosed embodiments can also improve performance and computing efficiency, while allowing for scalable deployment of active safety and autonomous driving systems. In addition, using a set of smaller neural networks (each optimized to perform a limited number of skills at a time) can help to improve computational and training efficiency.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof

What is claimed is:

1. A method for controlling an autonomous vehicle, the method comprising:
processing, at a high-level controller that executes a two-stage neural network, sensor data from a sensor system to generate a world representation of a particular driving scenario as represented by the sensor data, navigation route data that indicates a route of the autonomous vehicle, and position information that indicates location of the autonomous vehicle at a particular instant of time, wherein the world representation comprises: a feature map generated via a first stage of the two-stage neural network and a perception map generated via a second stage of the two-stage neural network based on the feature map, and wherein the processing, at the high-level controller that executes the two-stage neural network, comprises:
processing the feature map to detect objects based on the feature map;
classifying the detected objects according to semantic classes; and
generating the perception map based on the feature map,
wherein the feature map comprises: a machine-readable representation of the driving environment derived from raw-level sensor data provided directly from the sensor system and that includes features of the driving environment acquired via the sensor system at the particular instant of time, wherein the feature map comprises a concatenation of a range presence map derived from at least one of a radar system and a lidar system, a current vision-based feature map derived from images captured by at least one camera at the particular instant of time and a previous vision-based feature map derived from images captured by the at least one camera from a previous time instant; and
wherein the perception map comprises: a human-readable representation of the driving environment that includes scenes being acquired via the sensor system at the particular instant of time, wherein the perception map comprises: bounding box location, orientation, and velocity of each detected object that are detected from the perception map; an image segmentation of freespace that includes freespace features for the environment; road feature locations/types for the environment; and stixels that approximate object boundaries that are detected;
processing, at the high-level controller, the navigation route data, the position information and the feature map that includes features of the driving environment acquired via the sensor system at the particular instant of time to define an autonomous driving task;
decomposing, at the high-level controller, the autonomous driving task into a sequence of sub-tasks that address the particular driving scenario at the particular instant of time;
selecting from a plurality of sensorimotor primitive modules each comprising controller-executable instructions encoded on a non-transient controller-readable media, at the high-level controller based on the feature map that includes features of the driving environment acquired via the sensor system at the particular instant of time, a particular combination of sensorimotor primitive modules to be enabled and executed for the particular driving scenario, wherein the particular combination of the sensorimotor primitive modules is a subset of the plurality of sensorimotor primitive modules that address the particular driving scenario, wherein each one of the particular combination of the sensorimotor primitive modules directly maps information from the feature map to one or more control actions that automatically control the autonomous vehicle to result in a particular vehicle trajectory and speed profile that accomplishes a specific vehicle maneuver to address one of the sub-tasks in the sequence;
retrieving, via the high-level controller, the particular combination of the sensorimotor primitive modules from memory;
executing, at the high-level controller, the particular combination of the sensorimotor primitive modules such that each generates a vehicle trajectory and speed profile;
processing, at the high-level controller, a selected one of the vehicle trajectory and speed profiles to generate the control signals; and
processing, at a low-level controller, the control signals to generate commands that control one or more of actuators of the autonomous vehicle to execute one or more control actions to automatically control the autonomous vehicle to automate the autonomous driving task encountered in the particular driving scenario.

2. The method for controlling the autonomous vehicle according to claim 1, wherein each sensorimotor primitive module is executable to generate a vehicle trajectory and speed profile for automatically controlling the autonomous vehicle to cause the autonomous vehicle to perform a specific driving maneuver.

3. The method for controlling the autonomous vehicle according to claim 1, wherein processing, at the low-level controller, the control signals, comprises:

processing, at the low-level controller, control signals to generate commands that control one or more of actuators of the autonomous vehicle in accordance with the control signals to schedule and execute one or more control actions to be performed to automatically control the autonomous vehicle to automate the autonomous driving task encountered in the particular driving scenario and achieve the selected one of vehicle trajectory and speed profiles, wherein the actuators include one or more of a steering controller, a brake system, and a throttle system.

4. An autonomous vehicle control system, comprising:
a sensor system that is configured to provide sensor data;
a high-level controller comprising:
  at least one hardware-based processor; and
  memory comprising processor-executable instructions encoded on a non-transient processor-readable media, wherein the processor-executable instructions include a two-stage neural network, and
  wherein the at least one hardware-based processor is configurable to execute the processor-executable instructions of the two-stage neural network to:
    process the sensor data to generate a world representation of a particular driving scenario as represented by the sensor data at a particular instant of time, navigation route data that indicates a route of the autonomous vehicle, and position information that indicates location of the autonomous vehicle at the particular instant of time, wherein the world representation comprises:
      a feature map generated via a first stage of the two-stage neural network, wherein the feature map comprises: a machine-readable representation of the driving environment derived from raw-level sensor data provided directly from the sensor system and that includes features of the driving environment acquired via the sensor system at the particular instant of time, wherein the feature map comprises a concatenation of a range presence map derived from at least one of a radar system and a lidar system, a current vision-based feature map derived from images captured by at least one camera at the particular instant of time and a previous vision-based feature map derived from images captured by the at least one camera from a previous time instant; and
      a perception map generated via a second stage of the two-stage neural network based on the feature map, wherein the perception map comprises: a human-readable representation of the driving environment that includes scenes being acquired via the sensor system at the particular instant of time, wherein the perception map comprises: bounding box location, orientation, and velocity of each detected object that are detected from the perception map; an image segmentation of freespace that includes freespace features for the environment; road feature locations/types for the environment; and stixels that approximate object boundaries that are detected; and
    wherein the at least one hardware-based processor is further configurable to execute the processor-executable instructions of the two-stage neural network to:
      process the feature map to detect objects based on the feature map;
      classify the detected objects according to semantic classes; and
      generate the perception map based on the feature map;
  wherein the at least one hardware-based processor is configurable to execute the processor-executable instructions to:
    process the navigation route data, the position information and the feature map that includes features of the driving environment acquired via the sensor system at the particular instant of time to define an autonomous driving task;
    decompose the autonomous driving task into a sequence of sub-tasks that address the particular driving scenario at the particular instant of time;
    select, from a plurality of sensorimotor primitive modules based on the feature map that includes features of the driving environment acquired via the sensor system at the particular instant of time, a particular combination of the sensorimotor primitive modules to be enabled and executed for the particular driving scenario, wherein the particular combination of the sensorimotor primitive modules is a subset of the plurality of sensorimotor primitive modules that address the particular driving scenario, wherein each one of the particular combination of the sensorimotor primitive modules comprise controller-executable instructions encoded on a non-transient controller-readable media that directly maps information from the feature map to one or more control actions that automatically control the autonomous vehicle to result in a particular vehicle trajectory and speed profile that accomplishes a specific vehicle maneuver to address one of the sub-tasks in the sequence;
    retrieve the particular combination of the sensorimotor primitive modules from the memory; and
    execute the particular combination of the sensorimotor primitive modules such that each generates a vehicle trajectory and speed profile;
    process a selected one of the vehicle trajectory and speed profiles to generate the control signals; and
  a low-level controller configured to process the control signals to generate commands that control one or more of actuators of the autonomous vehicle to execute one or more control actions to automatically control the autonomous vehicle to automate the autonomous driving task encountered in the particular driving scenario.

5. The autonomous vehicle control system according to claim 4, wherein each sensorimotor primitive module is executable to generate a vehicle trajectory and speed profile for automatically controlling the autonomous vehicle to cause the autonomous vehicle to perform a specific driving maneuver.

6. The autonomous vehicle control system according to claim 4, further comprising:
  an actuator system comprising:
    a plurality of actuators of a vehicle, wherein the actuators include one or more of a steering controller, a brake system, and a throttle system; and
    wherein the low-level controller is configured to process the control signals to generate commands that control one or more of the actuators in accordance with the control signals to schedule and execute one or more control actions to be performed to automatically control the autonomous vehicle to automate the autonomous driving task encountered in the particular driving scenario and achieve the selected one of vehicle trajectory and speed profiles.

7. A controller for an autonomous vehicle, the controller comprising:

at least one hardware-based processor; and memory comprising processor-executable instructions encoded on a non-transient processor-readable media, wherein the processor-executable instructions include a two-stage neural network, and wherein the at least one hardware-based processor is configurable to execute the processor-executable instructions of the two-stage neural network to:

process sensor data from a sensor system to generate a world representation of a particular driving scenario as represented by the sensor data, navigation route data that indicates a route of an autonomous vehicle, and position information that indicates location of the autonomous vehicle at a particular instant of time, wherein the world representation comprises a feature map generated via a first stage of the two-stage neural network and a perception map generated via a second stage of the two-stage neural network based on the feature map, wherein the feature map comprises: a machine-readable representation of the driving environment derived from raw-level sensor data provided directly from the sensor system and that includes features of the driving environment acquired via the sensor system at the particular instant of time, wherein the feature map comprises a concatenation of a range presence map derived from at least one of a radar system and a lidar system, a current vision-based feature map derived from images captured by at least one camera at the particular instant of time and a previous vision-based feature map derived from images captured by the at least one camera from a previous time instant, and wherein perception map comprises: a human-readable representation of the driving environment that includes scenes being acquired via the sensor system at the particular instant of time, wherein the perception map comprises: bounding box location, orientation, and velocity of each detected object that are detected from the perception map; an image segmentation of freespace that includes freespace features for the environment; road feature locations/types for the environment; and stixels that approximate object boundaries that are detected;

wherein the at least one hardware-based processor is further configurable to execute the processor-executable instructions of the two-stage neural network to:

process the feature map to detect objects based on the feature map;

classify the detected objects according to semantic classes;

generate the perception map based on the feature map;

wherein the at least one hardware-based processor is configurable to execute the processor-executable instructions to:

process the navigation route data, the position information and the feature map that includes features of the driving environment acquired via the sensor system at the particular instant of time to define an autonomous driving task;

decompose the autonomous driving task into a sequence of sub-tasks that address the particular driving scenario at the particular instant of time; and select based on the feature map that includes features of the driving environment acquired via the sensor system at the particular instant of time, from a plurality of sensorimotor primitive modules each comprising controller-executable instructions encoded on a non-transient controller-readable media, a particular combination of sensorimotor primitive modules to be enabled and executed for the particular driving scenario, wherein the particular combination of the sensorimotor primitive modules is a subset of the plurality of sensorimotor primitive modules that address the particular driving scenario, wherein each one of the particular combination of the sensorimotor primitive modules directly maps information from the feature map to one or more control actions that automatically control the autonomous vehicle to result in a particular vehicle trajectory and speed profile that accomplishes a specific vehicle maneuver to address one of the sub-tasks in the sequence;

retrieve the particular combination of the sensorimotor primitive modules from memory; and execute the particular combination of the sensorimotor primitive modules such that each generates a vehicle trajectory and speed profile;

process a selected one of the vehicle trajectory and speed profiles to generate the control signals; and process the control signals to generate commands that control one or more of actuators of the autonomous vehicle to execute one or more control actions to automatically control the autonomous vehicle to automate the autonomous driving task encountered in the particular driving scenario.

8. The controller for the autonomous vehicle according to claim 7, wherein each sensorimotor primitive module is executable to generate a vehicle trajectory and speed profile for automatically controlling the autonomous vehicle to cause the autonomous vehicle to perform a specific driving maneuver.

9. The controller for the autonomous vehicle according to claim 7, wherein the low-level controller is configured to process the control signals to generate commands that control one or more actuators of the autonomous vehicle in accordance with the control signals to schedule and execute one or more control actions to be performed to automatically control the autonomous vehicle to automate the autonomous driving task encountered in the particular driving scenario and achieve the selected one of vehicle trajectory and speed profiles, and wherein the actuators include one or more of a steering controller, a brake system, and a throttle system.

* * * * *